US012574330B2

(12) United States Patent
Gao et al.

(10) Patent No.: US 12,574,330 B2
(45) Date of Patent: Mar. 10, 2026

(54) INFORMATION PROCESSING METHOD, NETWORK DEVICE, NETWORK SYSTEM, AND STORAGE MEDIUM

(71) Applicant: ZTE CORPORATION, Shenzhen (CN)

(72) Inventors: Chenqiang Gao, Shenzhen (CN); Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 337 days.

(21) Appl. No.: 18/264,672

(22) PCT Filed: May 6, 2022

(86) PCT No.: PCT/CN2022/091261
§ 371 (c)(1),
(2) Date: Aug. 8, 2023

(87) PCT Pub. No.: WO2022/247603
PCT Pub. Date: Dec. 1, 2022

(65) Prior Publication Data
US 2024/0113981 A1      Apr. 4, 2024

(30) Foreign Application Priority Data

May 28, 2021   (CN) .......................... 202110588349.1

(51) Int. Cl.
*H04L 47/283*        (2022.01)
*H04L 45/00*         (2022.01)
*H04L 45/50*         (2022.01)
(52) U.S. Cl.
CPC ............ *H04L 47/283* (2013.01); *H04L 45/34* (2013.01); *H04L 45/50* (2013.01)

(58) Field of Classification Search
CPC ....... H04L 47/283; H04L 45/34; H04L 45/50; H04L 47/32; H04L 47/35; H04L 47/56; H04L 47/564; H04L 45/74
See application file for complete search history.

(56) References Cited

U.S. PATENT DOCUMENTS 10,992,843 B2   4/2021  Lin
2010/0329279 A1* 12/2010  Li ........................... H04W 8/04
370/465

(Continued)

FOREIGN PATENT DOCUMENTS

CN        1893392  A      1/2007
CN      110301116  A     10/2019

(Continued)

OTHER PUBLICATIONS

Intellectual Property India. Examination Report for IN Application No. 202327051935 and English translation, mailed May 1, 2025, pp. 1-7.

(Continued)

*Primary Examiner* — Kan Yuen
(74) *Attorney, Agent, or Firm* — Vivacqua Crane, PLLC

(57)                ABSTRACT
An information processing method, a network device, a network system, and a storage medium are disclosed. The information processing method may include: receiving a first data message comprising first time adjustment information; performing first processing on the first data message to obtain the first time adjustment information; acquiring a processing time for performing the first processing on the first data message; and in response to determining a presence of data message timeout processing, performing second processing on the first data message based on the first time adjustment information, the processing time and a preset processing time threshold.

17 Claims, 10 Drawing Sheets

(56)                  References Cited

U.S. PATENT DOCUMENTS

| | | |
|---|---|---|
| 2014/0304798 A1 | 10/2014 | Iyengar et al. |
| 2018/0317275 A1 | 11/2018 | Chang et al. |
| 2020/0008175 A1* | 1/2020 | Fu ........................... G06F 9/546 |
| 2020/0029243 A1* | 1/2020 | Wei ......................... H04L 1/187 |
| 2020/0052926 A1 | 2/2020 | Sung et al. |
| 2023/0179534 A1* | 6/2023 | Wang ................... H04L 47/564 |
| 2023/0300672 A1* | 9/2023 | Verma ................... H04W 76/19 |
| | | 370/328 |
| 2024/0163496 A1* | 5/2024 | Toba ................. H04N 21/4302 |

FOREIGN PATENT DOCUMENTS

| | | |
|---|---|---|
| EP | 1940089 A1 | 7/2008 |
| EP | 3709546 A1 | 9/2020 |
| KR | 20180098398 A | 9/2018 |

OTHER PUBLICATIONS

European Patent Office. Extended European Search Report for EP
Application No. 22810331.3, mailed Jul. 12, 2024, pp. 1-17.
International Searching Authority. International Search Report and
Written Opinion for PCT Application No. PCT/CN2022/091261
and English translation, mailed Jul. 20, 2022, pp. 1-10.

* cited by examiner

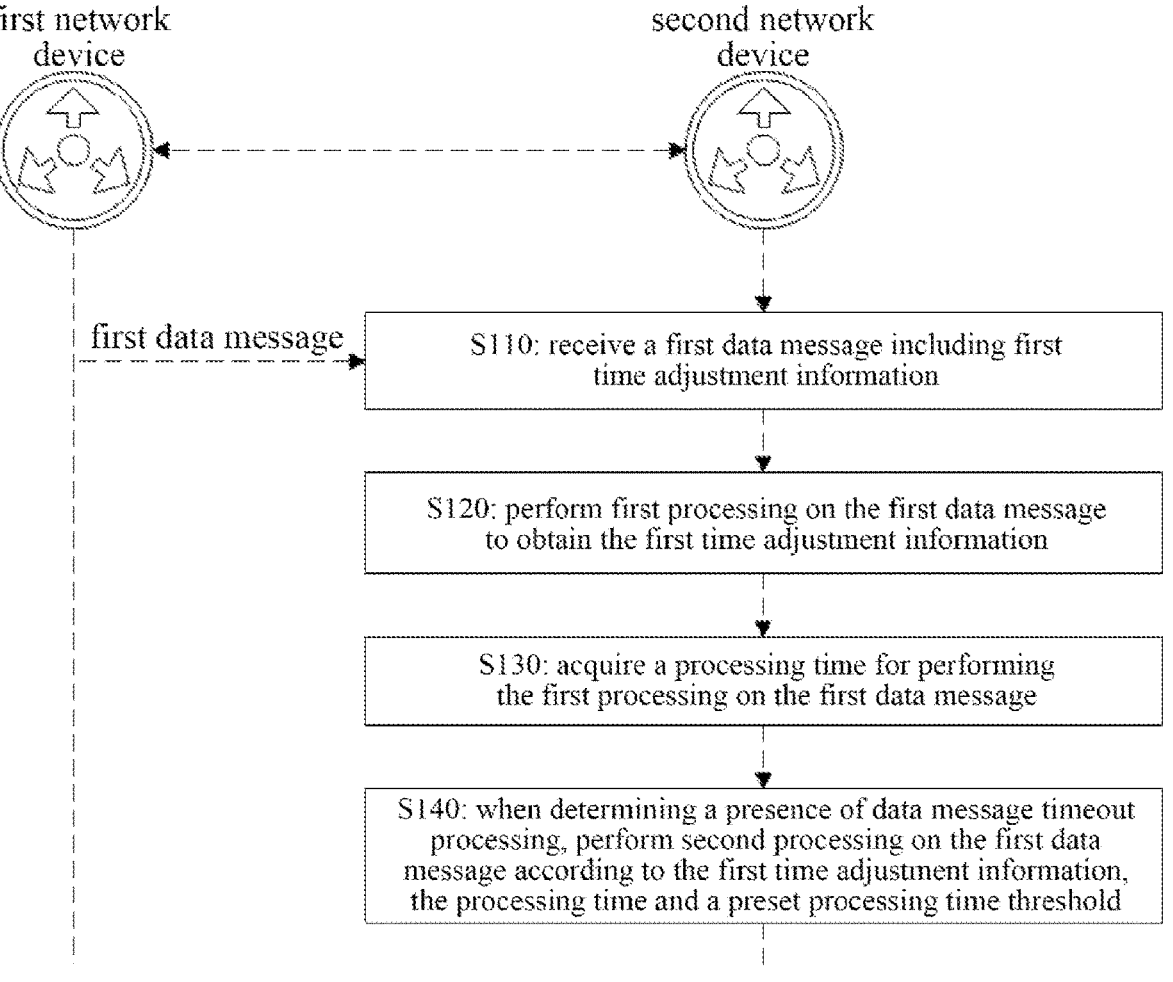

first network
device second network
device first data message

S110: receive a first data message including first
time adjustment information

S120: perform first processing on the first data message
to obtain the first time adjustment information S130: acquire a processing time for performing
the first processing on the first data message S140: when determining a presence of data message timeout
processing, perform second processing on the first data
message according to the first time adjustment information,
the processing time and a preset processing time threshold

FIG. 2

| symbol field | time adjustment information field | unit field |
| --- | --- | --- |

FIG. 3

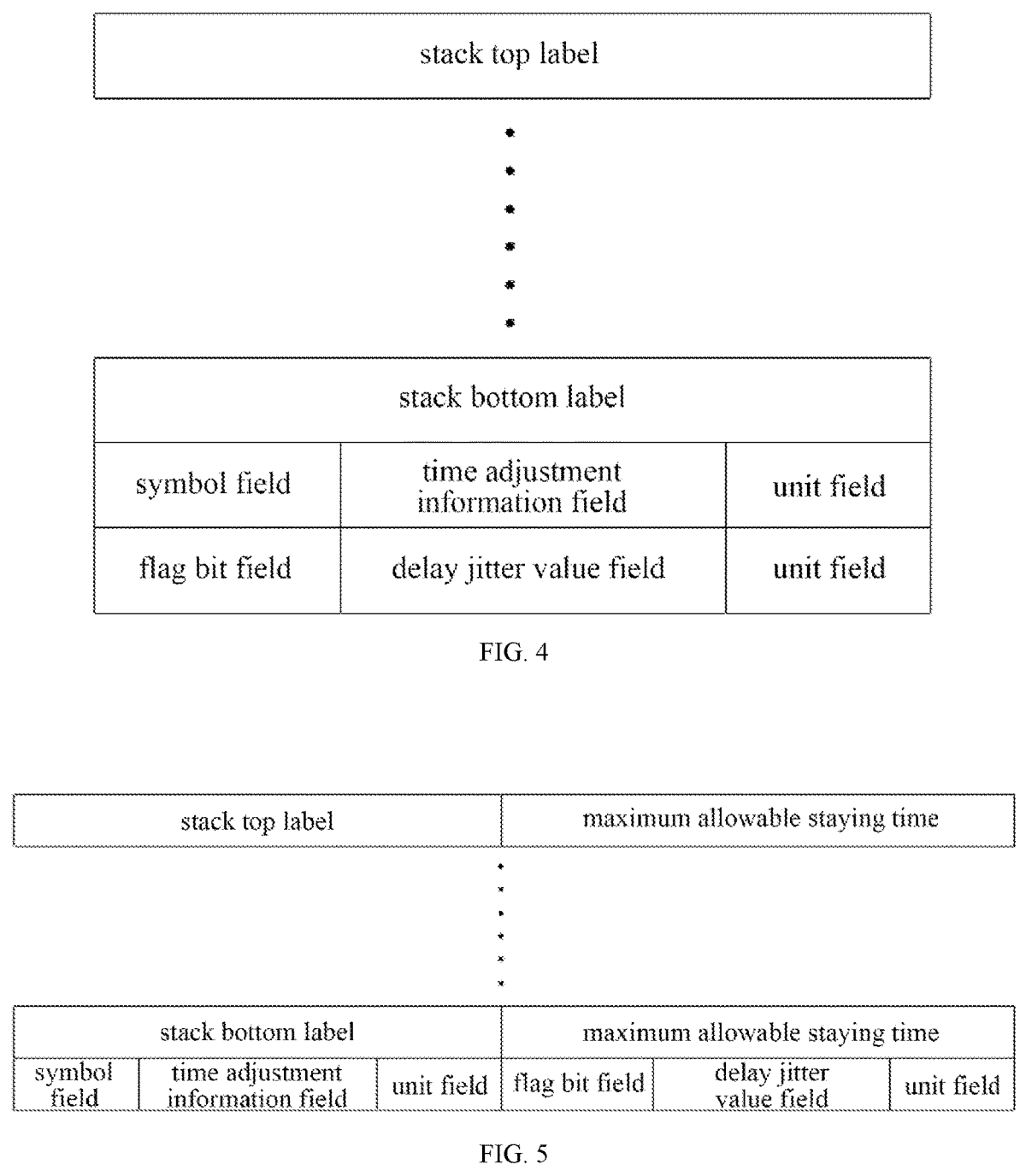

| stack top label | | |
|:---:|:---:|:---:|

. . . . . .

| stack bottom label | | |
|:---:|:---:|:---:|
| symbol field | time adjustment information field | unit field |
| flag bit field | delay jitter value field | unit field |

FIG. 4

| stack top label | maximum allowable staying time |
|:---:|:---:|

. . . . . .

| stack bottom label | | | maximum allowable staying time | | |
|:---:|:---:|:---:|:---:|:---:|:---:|
| symbol field | time adjustment information field | unit field | flag bit field | delay jitter value field | unit field |

FIG. 5

| ether type field | symbol field | time adjustment information field | unit field | flag bit field | delay jitter value field | unit field |
|---|---|---|---|---|---|---|

| flag bit field | delay jitter value field | unit field |
|---|---|---|

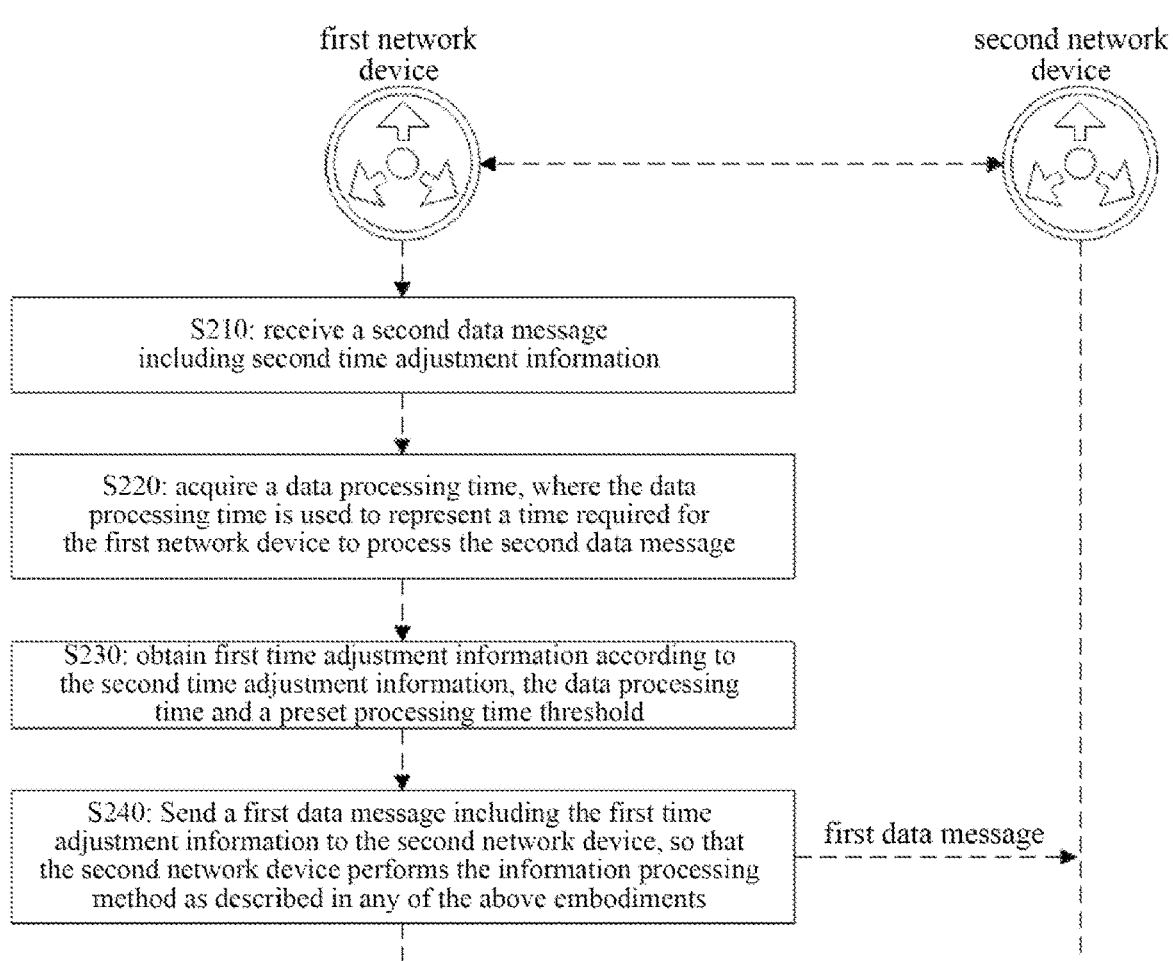

first network device    second network device

S210: receive a second data message including second time adjustment information S220: acquire a data processing time, where the data processing time is used to represent a time required for the first network device to process the second data message S230: obtain first time adjustment information according to the second time adjustment information, the data processing time and a preset processing time threshold S240: Send a first data message including the first time adjustment information to the second network device, so that the second network device performs the information processing method as described in any of the above embodiments first data message

FIG. 12

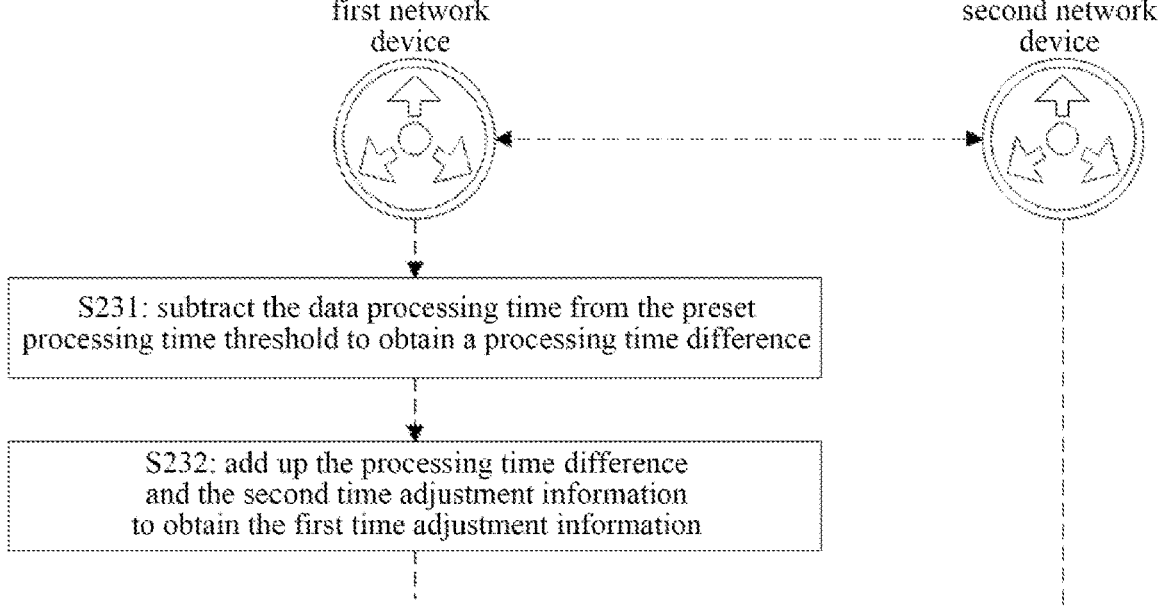

first network device    second network device

S231: subtract the data processing time from the preset processing time threshold to obtain a processing time difference S232: add up the processing time difference and the second time adjustment information to obtain the first time adjustment information

FIG. 13

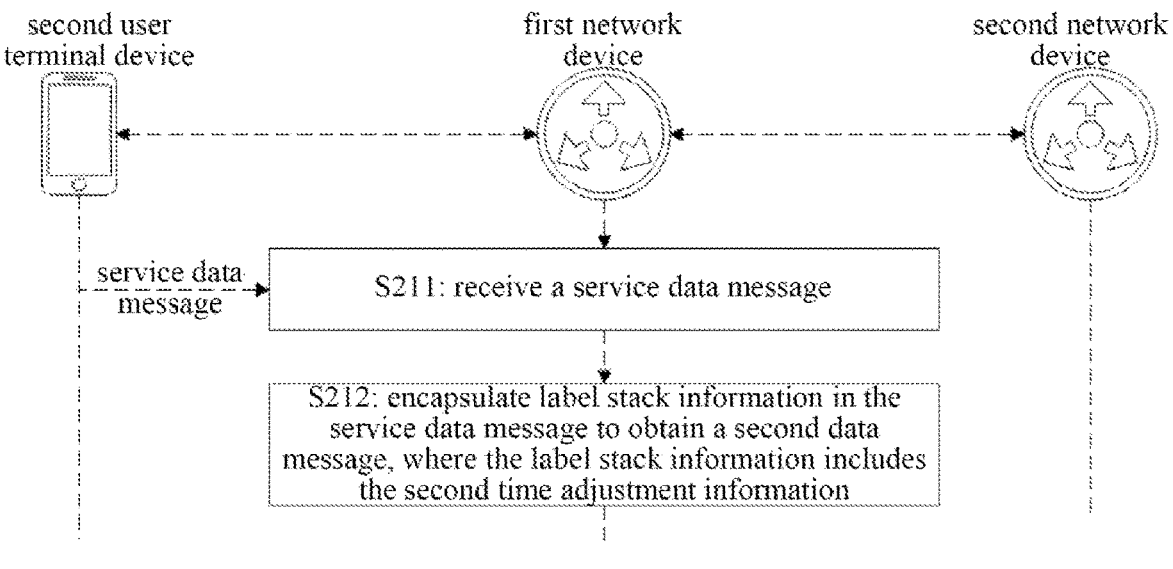

second user
terminal device first network
device second network
device service data
message S211: receive a service data message S212: encapsulate label stack information in the service data message to obtain a second data message, where the label stack information includes the second time adjustment information

FIG. 14 first network
device second network
device first data message

S310: the second network device receives a first data message sent by the first network device, where the first data message includes first time adjustment information S320: the second network device performs first processing on the first data message to obtain the first time adjustment information S330: the second network device acquires a processing time for performing the first processing on the first data message S340: When determining a presence of data message timeout processing, the second network device performs second processing on the first data message according to the first time adjustment information, the processing time and a preset processing time threshold

FIG. 15

| label value | forwarding port | preset processing time threshold |
|---|---|---|
| 1601 | interface1 | 31us |

FIG. 17

| label value | forwarding port | preset processing time threshold |
|---|---|---|
| 1602 | interface2 | 31us |

FIG. 18

| label value | forwarding port | preset processing time threshold |
|---|---|---|
| 1603 | interface0 | 31us |

FIG. 19

| label value | forwarding port | preset processing time threshold |
|---|---|---|
| 1604 | interface2 | 31us |

FIG. 20

| | | |
|---|---|---|
| 1601 | | |
| 1602 | | |
| 1603 | | |
| 1604 | | |
| 0 | 0 | 01 |
| 1 | 10100 | 01 |

FIG. 21

| | | | | | |
|---|---|---|---|---|---|
| 1601 | | | 31 | | |
| 1602 | | | 31 | | |
| 1603 | | | 31 | | |
| 1604 | | | 31 | | |
| 0 | 0 | 01 | 1 | 10100 | 01 |

FIG. 22

INFORMATION PROCESSING METHOD, NETWORK DEVICE, NETWORK SYSTEM, AND STORAGE MEDIUM

CROSS-REFERENCE TO RELATED APPLICATION

This application is a national stage filing under 35 U.S.C. § 371 of international application number PCT/CN2022/091261, filed May 6, 2022, which claims priority to Chinese patent application No. 202110588349.1 filed May 28, 2021. The entire contents of these applications are incorporated herein by reference in their entirety.

TECHNICAL FIELD

The present disclosure relates to the technical field of communication, in particular to an information processing method, a network device, a network system and a storage medium.

BACKGROUND

In Time Sensitive Networking (TSN), in order to ensure the end-to-end delay of a deterministic traffic flow, the IEEE 802.1Qbv defines a scheduling mechanism for a Time Awareness Shaper (TAS), which dynamically provides on/off control for an exit queue based on a preset periodic gate control list. Each network device on a transmission path is configured to determine the gate control time, and schedules data packets in a deterministic queue through the on/off of a gate, so that the deterministic traffic flow is forwarded at the preset gate on time.

The Segment Routing (SR) technology provides an extensible network programming method. An SR instruction is included in a data packet in the form of a first-in first-out stack, which is used to indicate forwarding decisions of continuous routers. The SR technology may be used to select a transmission path which is short enough to provide an end-to-end delay low enough without affecting the queuing of single packet data in each network device along the transmission path.

At present, in the related technical schemes, a scheme to realize deterministic forwarding of TSN combines a path distribution function of SR and a queue scheduling mechanism of TSN. However, in the current scheme, the problem of data packet timeout processing by a network device is not taken into consideration. When the problem of data packet timeout processing occurs in a certain network device, the TSN will not be able to guarantee the end-to-end deterministic delay, thus failing to meet the requirements of TSN for end-to-end delay.

SUMMARY

The following is an overview of the subject described in detail herein. This overview is not intended to limit the scope of protection of the claims.

Embodiments of the present disclosure provide an information processing method, a network device, a network system, and a storage medium.

In accordance with a first aspect of an embodiment of the present disclosure, an information processing method may include: receiving a first data message including first time adjustment information; performing first processing on the first data message to obtain the first time adjustment information; acquiring a processing time for performing the first processing on the first data message; and in response to determining a presence of data message timeout processing, performing second processing on the first data message based on the first time adjustment information, the processing time and a preset processing time threshold.

In accordance with a second aspect of an embodiment of the present disclosure, an information processing method, which is applied to a first network device, may include: receiving a second data message including second time adjustment information; acquiring a data processing time being used to represent the time required by the first network device for processing the second data message; obtaining first time adjustment information based on the second time adjustment information, the data processing time and a preset processing time threshold; and sending a first data message including the first time adjustment information to a second network device, so that the second network device is configured to perform the information processing method described in the first aspect.

In accordance with a third aspect of an embodiment of the present disclosure, an information processing method, which is applied to a network system including a first network device and a second network device, may include: receiving, by the second network device, a first data message sent by the first network device, the first data message including first time adjustment information; performing, by the second network device, first processing on the first data message to obtain the first time adjustment information; acquiring, by the second network device, a processing time for performing the first processing on the first data message; and in response to determining a presence of data message timeout processing, performing, by the second network device, second processing on the first data message based on the first time adjustment information, the processing time and a preset processing time threshold.

In accordance with a fourth aspect of an embodiment of the present disclosure, a network device may include: a memory, a processor, and a computer program stored in the memory and executable by the processor, where the computer program, when executed by the processor, causes the processor to implement the information processing method described in the first aspect or the information processing method described in the second aspect.

In accordance with a fifth aspect of an embodiment of the present disclosure, a network system may include a first network device and a second network device which are configured to cooperate with each other to perform the information processing method described in the third aspect.

In accordance with a sixth aspect of an embodiment of the present disclosure, a computer-readable storage medium stores a computer-executable instruction which, when executed by a processor, causes the processor to implement the information processing method as described above.

Other features and advantages of the present disclosure will be set forth in the following description, and partly become apparent from the description, or are understood by implementing the present disclosure. The objects and other advantages of the present disclosure can be realized and obtained by the structure particularly specified in the description, claims, and accompanying drawings.

BRIEF DESCRIPTION OF DRAWINGS

The drawings are provided for a further understanding of the technical schemes of the present disclosure, and constitute a part of the description. The drawings, together with the embodiments of the present disclosure, are used to illustrate the technical schemes of the present disclosure, and do not constitute a limitation to the technical schemes of the present disclosure.

FIG. 2 is a flowchart of an information processing method provided by an embodiment of the present disclosure;

FIG. 3 is a schematic diagram of an encapsulation structure for encapsulating first time adjustment information provided by an example of the present disclosure;

FIG. 4 is a schematic diagram of an encapsulation structure of label stack information provided by an example of the present disclosure;

FIG. 5 is a schematic diagram of an encapsulation structure of label stack information provided by another example of the present disclosure;

FIG. 12 is a flowchart of an information processing method provided by another embodiment of the present disclosure;

FIG. 13 is a flowchart of a method of step S230 in FIG. 12;

FIG. 14 is a flowchart of a method of step S210 in FIG. 12;

FIG. 15 is a flowchart of an information processing method provided by another embodiment of the present disclosure;

FIG. 17 is a schematic diagram of a label forwarding table in a first router provided by an example of the present disclosure;

FIG. 18 is a schematic diagram of a label forwarding table in a second router provided by an example of the present disclosure;

FIG. 19 is a schematic diagram of a label forwarding table in a third router provided by an example of the present disclosure;

FIG. 20 is a schematic diagram of a label forwarding table in a fourth router provided by an example of the present disclosure;

FIG. 21 is a schematic diagram of label stack information issued to the first router by a network controller in an example of the present disclosure; and FIG. 22 is a schematic diagram of label stack information issued to the first router by a network controller in another example of the present disclosure.

DETAILED DESCRIPTION

In order to make the objects, technical schemes and advantages of the present disclosure clear, the present disclosure will be further described in detail in conjunction with the drawings and embodiments. It should be understood that the embodiments described here are only used to illustrate the present disclosure, and are not used to limit the present disclosure.

It is to be noted, although logical orders have been shown in the flowcharts, in some cases, the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides an information processing method, a network device, a network system, and a computer-readable storage medium. The information processing method includes: receiving a first data message including first time adjustment information; performing first processing on the first data message to obtain the first time adjustment information; acquiring a processing time for performing the first processing on the first data message; and when it is determined that data message timeout processing is presence, performing second processing on the first data message based on to the first time adjustment information, the processing time and a preset processing time threshold. Therefore, in the case of presence of data message timeout processing in the network device, second processing may be performed on the first data message based on the preset processing time threshold, the first time adjustment information carried in the first data message and the processing time for performing the first processing on the first data message, so that the transmission of the data message can meet the requirements of Time Sensitive Networking (TSN) for end-to-end delay.

The embodiments of the present disclosure will be further illustrated in conjunction with the drawings.

Figure 1:
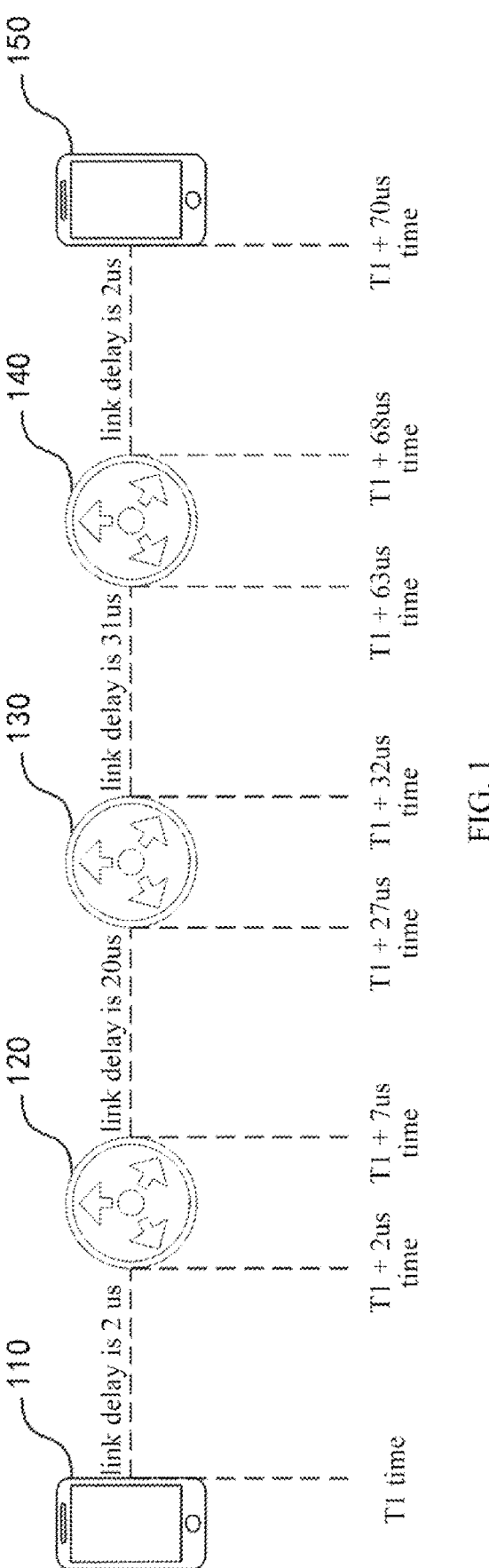
FIG. 1 is a schematic diagram of a network topology on which an information processing method provided by an embodiment of the present disclosure is performed.

FIG. 1 is a schematic diagram of a network topology on which an information processing method provided by an embodiment of the present disclosure is performed. In the example shown in FIG. 1, the network topology includes a first terminal device 110, a first routing device 120, a second routing device 130, a third routing device 140 and a second terminal device 150 which are communicatively connected in sequence. In addition, the network topology further includes a network controller (not shown in the figure) connected with the first routing device 120, the second routing device 130 and the third routing device 140, respectively. The first routing device 120, the second routing device 130 and the third routing device 140 may be network devices such as routers, switches or the like, which can forward messages. The network controller may be a Software Defined Network (SDN) controller or the like, which can control the first routing device 120, the second routing device 130 and the third routing device 140, respectively.

The network controller may acquire various network information such as network topology, link delay, message processing delay of a device, message processing delay jitter of a device, etc., through the routing devices. In addition, the network controller may also issue forwarding label information, forwarding port information corresponding to the forwarding label information, and the maximum allowable time for a device to process a message (or the maximum allowable time for a message to stay in a device) to each routing device, so that each routing device can establish a label forwarding table according to such information.

Each of the first terminal device 110 and the second terminal device 150 may be referred to as an access terminal device, a User Equipment (UE), a user unit, a user station, a mobile radio station, a mobile station, a remote station, a remote terminal device, a mobile device, a user terminal device, a wireless communication device, a user proxy, or a user device. For example, both the first terminal device 110 and the second terminal device 150 may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in 5G network or in future 5G+network, etc., which is not limited in this embodiment.

In an implementation, the network controller acquires various network information such as network topology, link delay, link delay, message processing delay of a device, message processing delay jitter of a device, etc., through each of the routing devices. When acquiring various network information through the routing devices, the network controller may also acquire a processing delay jitter value of each of the routing devices. In the case that there is no processing delay jitter value in a routing device, the network controller may configure a processing delay jitter value for the routing device in advance, and then form a query table with the processing delay jitter values and issue the query table to the routing devices. Based on the network information, the network controller is configured to determine the forwarding label information from the first routing device 120 to the third routing device 140, the forwarding port information corresponding to the forwarding label information and the maximum allowable time for all routing devices to process messages, and form label stack information according to the forwarding label information. The first routing device 120 is a starting node of a transmission path, while the third routing device 140 is an end node of the transmission path. The time adjustment information is encapsulated in the label stack information. Then, the network controller is configured to send the forwarding label information, the forwarding port information corresponding to the forwarding label information, the maximum allowable time for all routing devices to process messages to all the routing devices and the like, so that each of the routing devices constructs a local label forwarding table or a label mapping table according to such information. In addition, the network controller is also configured to send the label stack information to the first routing device 120 serving as the starting node. The label stack information includes label information corresponding to segments in the transmission path. Based on the label information, a data message may be forwarded to a corresponding segment, so that a corresponding routing device is able to receive the data message. In a case where the first routing device 120 receives a data message from the first terminal device 110, the first routing device 120 is configured to encapsulate the label stack information in the data message, and then forward the data message in which the time adjustment information is encapsulated based on the label stack information. After receiving the data message in which the time adjustment information is encapsulated, the third routing device 140 is configured to determine whether to send the data message to the second terminal device 150 based on a processing time for the third routing device to process the data message, the maximum allowable time for the third routing device 140 to process the data message, and time adjustment information recorded in the label stack information.

The network topology and application scenarios described in the embodiments of the present disclosure are intended to illustrate the technical schemes of the embodiments of the present disclosure clearly, and are not intended to limit the technical schemes provided by the embodiments of the present disclosure. Those having ordinary skills in the art know that, with the evolution of network topologies and the emergence of new application scenarios, the technical schemes provided by the embodiments of the present disclosure are also applicable to similar technical problems.

Those having ordinary skills in the art can understand that the network topology shown in FIG. 1 does not constitute a limitation to the embodiment of the present disclosure and may include more or less components than shown, or combinations of components, or different component arrangements.

Based on the above network topology, various embodiments of the information processing method of the present disclosure are proposed below.

As shown in FIG. 2, FIG. 2 is a flowchart of an information processing method provided by an embodiment of the present disclosure. The information processing method may be applied to a routing device serving as an end node, such as the third routing device 140 in the network topology shown in FIG. 1. In this embodiment, the second network device is taken as an execution subject for description. The information processing method may include, but not limited to, the following steps S110, S120, S130 and S140.

At S110, a first data message is received, where the first data message includes first time adjustment information.

In this step, the second network device may receive a first data message from the first network device, and the first data message may include first time adjustment information.

It should be noted that the first time adjustment information is an adjustment value of a staying time of the first data message in the routing device. For example, in this step, assuming that the first time adjustment information is 3 μs, it means that the staying time of the first data message in the routing device may be extended by 3 μs; and assuming that the first time adjustment information is −6 μs, it means that the staying time of the first data message in the routing device needs to be shortened by 6 μs, indicating that the routing device receives the first data message with a delay of 6 μs as compared with the time allocation performed in the network controller in advance. Therefore, based on a specific value of the first time adjustment information, it can be inferred whether the routing device receives the first data message early or with a delay, thus facilitating corresponding processing on the first data message in a subsequent step based on the first time adjustment information.

It should be noted that there are many different ways to encapsulate the first time adjustment information in the first data message. For example, when the label stack information issued by the network controller is encapsulated in the first data message, a label entry for encapsulating the first time adjustment information may be newly added to the label stack information which may be a label list in the Segment Routing Multi-Protocol Label Switching (SR-MPLS) technology in which segment routing is applied to MPLS forwarding plane, a segment identifier list in the Segment Routing IPv6 (SRv6) technology in which segment routing is applied to IPv6 forwarding plane, or data stack information in other similar technologies, which is not limited in this embodiment. For another example, when the first data message is a message adopting a Layer 2 Ethernet frame encapsulation structure to which a message encapsulation structure for encapsulating the first time adjustment information may be newly added.

As shown in FIG. 3, FIG. 3 is a schematic diagram of an encapsulation structure for encapsulating first time adjustment information provided by an example. In FIG. 3, the encapsulation structure includes a symbol field, a time adjustment information field and a unit field. The symbol field is used to indicate whether the first time adjustment information is positive or negative. For example, when the symbol field has a value of 0, it indicates that the first time adjustment information is positive, and when the symbol field has a value of 1, it indicates that the first time adjustment information is negative. The time adjustment information field is used to indicate the specific numerical value (absolute value) of the first time adjustment information. The unit field is used to indicate the unit of the first time adjustment information. For example, when the value of the unit field is a binary value of "00", it indicates that the unit of the first time adjustment information is ns; when the value of the unit field is a binary value "01", it indicates that the unit of the first time adjustment information is s; when the value of the unit field is a binary value of "10", it indicates that the unit of the first time adjustment information is ms; and when the value of the unit field is a binary value of "11", it indicates that the unit of the first time adjustment information is s. In an example, assuming that the value of the symbol field is 0, the value of the time adjustment information field is 9, and the value of the unit field is a binary value "01", the specific value of the first time adjustment information is 9 μs.

As shown in FIG. 4, FIG. 4 is a schematic diagram of an encapsulation structure of label stack information provided by an example. In FIG. 4, the label stack information is a label list in the SR-MPLS technology. The label stack information includes labels corresponding to segments in the transmission path and a newly added label entry for encapsulating the first time adjustment information. The encapsulation structure of the label entry is shown in FIG. 3, and the label entry is set below a stack bottom label in the label stack information.

As shown in FIG. 5, FIG. 5 is a schematic diagram of an encapsulation structure of label stack information provided by another example. In FIG. 5, the label stack information is a segment identifier list in the SRv6 technology. The label stack information includes segment identifiers corresponding to segments in the transmission path, the maximum allowable time for a message to stay in a device, and a newly added encapsulation structure for encapsulating the first time adjustment information. The encapsulation structure for encapsulating the first time adjustment information is shown in FIG. 3, and is set below the stack bottom segment identifier in the label stack information. It should be noted that in a position where the segment identifier is set, a corresponding maximum allowable staying time is also set. That is, both the segment identifier and the corresponding maximum allowable staying time form a complete segment identifier entry, and both at least one segment identifier entry and the encapsulation structure for encapsulating the first time adjustment information form the segment identifier list.

Figures 6, 7:
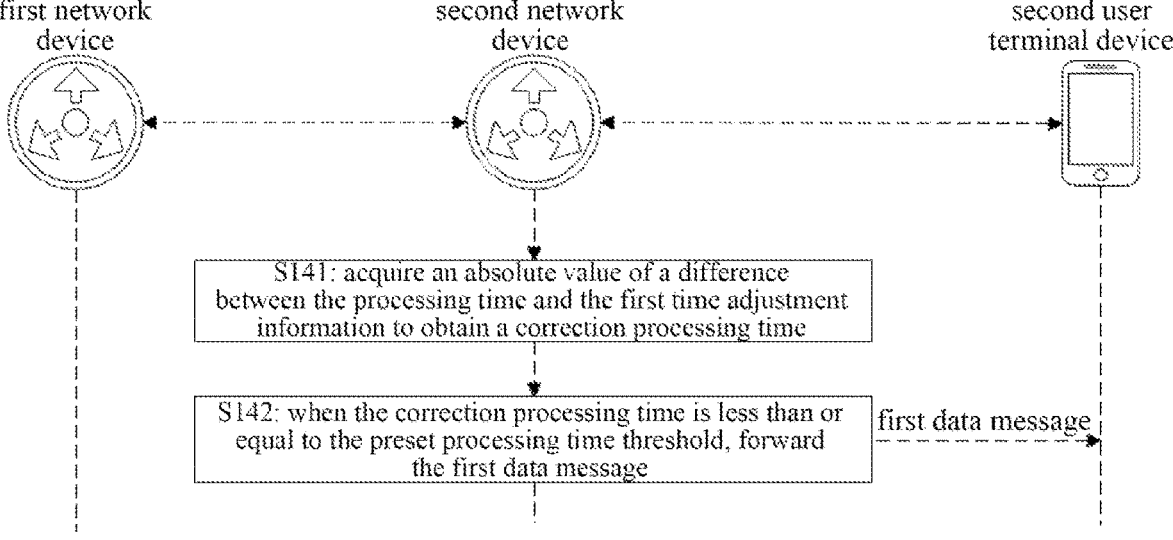
FIG. 6 is a schematic diagram of a message encapsulation structure provided by an example of the present disclosure.
FIG. 7 is a flowchart of a method of step S140 in FIG. 2.

As shown in FIG. 6, FIG. 6 is a schematic diagram of a message encapsulation structure provided by an example. The message encapsulation structure is an encapsulation substructure newly added into the Layer 2 Ethernet frame encapsulation structure. In FIG. 6, the message encapsulation structure includes an Ethernet type field, and an encapsulation structure for encapsulating the first time adjustment information as shown in FIG. 3, which is set behind the Ethernet type field. The Ethernet type field is used to indicate an Ethernet type, which specifies a specific value. For example, referring to the definition of the existing Layer 2 Ethernet frame encapsulation, the specific value may be 0x88F7.

At S120, first processing is performed on the first data message to obtain the first time adjustment information.

In this step, since the first data message including the first time adjustment information is obtained at S110, first processing may be performed on the first data message to obtain the first time adjustment information. Therefore, corresponding processing may be performed on the first data message in the subsequent step based on the first time adjustment information.

It should be noted that performing first processing on the first data message at least includes acquiring data information carried by the first data message. For example, the first processing may include: acquiring the first time adjustment information carried by the first data message, acquiring label information in the label stack information carried by the first data message, acquiring forwarding port information according to the label information and a local label forwarding table, etc., which is not limited in this embodiment.

At S130, a processing time for performing the first processing on the first data message is acquired.

In this step, since first processing is performed on the first data message in S120, the processing time for performing the first processing on the first data message may be acquired, thus facilitating corresponding processing on the first data message in the subsequent step based on the processing time and the first time adjustment information obtained in S120.

In an implementation, acquiring a processing time for performing the first processing on the first data message may include: acquiring a receiving timestamp of receiving the first data message, acquiring a completion timestamp of completing the first processing performed on the first data message, and calculating a difference between the completion timestamp and the receiving timestamp to obtain the processing time for performing the first processing on the first data message.

In another implementation, acquiring a processing time for performing the first processing on the first data message may include: starting a preset timer when the first data message is received, so that the timer starts counting from 0, and stopping the timer when the first processing performed on the first data message is completed, and acquiring a timing value of the timer to obtain the processing time for performing the first processing on the first data message.

At S140, when it is determined that data message timeout processing is presence, second processing is performed on the first data message based on the first time adjustment information, the processing time and a preset processing time threshold.

In this step, since the first time adjustment information is obtained in S120 and the processing time for performing the first processing on the first data message is obtained in S130, when it is determined that data message timeout processing is presence, corresponding second processing may be performed on the first data message based on the first time adjustment information, the processing time and the preset processing time threshold.

It should be noted that the second processing performed on the first data message may include forwarding the first data message or discarding the first data message. For example, when it is determined that the first data message may be forwarded to a user terminal device within a specified total path transmission delay based on the first time adjustment information, the processing time and the preset processing time threshold, the second processing performed on the first data message is forwarding the first data message; and when it is determined that the first data message may not be forwarded to the user terminal device within the specified total path transmission delay based on the first time adjustment information, the processing time and the preset processing time threshold, the second processing performed on the first data message is discarding the first data message.

It should be noted that the data message timeout processing includes at least one of a time of receiving the first data message exceeding a preset receiving time or the processing time for performing first processing on the first data message being greater than the preset processing time threshold. For example, when the time of receiving the first data message exceeds the preset receiving time, it indicates the presence of data message timeout processing in at least one routing device before this routing device, which may lead to the problem of transmission delay of the first data message in the current transmission path. For another example, when the processing time for performing first processing on the first data message is greater than the preset processing time threshold, it indicates the presence of data message timeout processing in this routing device, which may lead to the problem of transmission delay of the first data message in the current transmission path. Since the first time adjustment information is an adjustment value of the staying time of the first data message in the routing device, the time for forwarding the first data message may be adjusted based on the first time adjustment information, the processing time and the preset processing time threshold, such that the transmission of the first data message can meet the requirements of TSN for end-to-end delay.

It should be noted that the preset processing time threshold is the maximum allowable time for a device to process the message (or the maximum allowable time for a message to stay in a device). The preset processing time threshold may be calculated by the network controller based on information such as network topology, link delay and processing delay of a message by a routing device which is a deviation value of the processing time of the message due to the routing device. The processing delay is uploaded to the network controller by the routing device. Generally, the processing delays of messages due to each of the routing devices are identical. For example, in the network topology shown in FIG. 1, assuming that the processing delays of the first routing device 120, the second routing device 130 and the third routing device 140 are all 5 μs, the link delay between the first terminal device 110 and the first routing device 120 is 2 μs, the link delay between the first routing device 120 and the second routing device 130 is 20 μs, the link delay between the second routing device 130 and the third routing device 140 is 31 μs, the link delay between the third routing device 140 and the second terminal device 150 is 2 s, and a total delay of the data message from the first terminal device 110 to the second terminal device 150 is required to be 100 μs, so the transmission path from the first routing device 120 to the third routing device 140 has an idle time of 30 μs (100 μs–2 μs–5 μs–20 μs–5 μs–31 μs–s–2 μs=30 μs). Therefore, an average idle time allocated to these three routing devices may be 10 μs. Therefore, the preset processing time threshold allocated to each routing device may be s (5 μs+10 μs=15 μs). What is worth noting is the processing delay of each routing device.

It should be noted that the preset receiving time may be calculated by the network controller based on information such as network topology, link delay and processing delay of a message due to the routing device, and different routing devices have different preset receiving times. For example, in the network topology shown in FIG. 1, assuming that the processing delays of the first routing device 120, the second routing device 130 and the third routing device 140 are all 5 μs, the link delay between the first terminal device 110 and the first routing device 120 is 2 s, the link delay between the first routing device 120 and the second routing device 130 is 20 μs, the link delay between the second routing device 130 and the third routing device 140 is 31 μs, the link delay between the third routing device 140 and the second terminal device 150 is 2 μs, and assuming that the first terminal device 110 sends a data message to the first routing device 120 at time T1, the preset receiving time of the first routing device 120 is T1+2 μs, the preset receiving time of the second routing device 130 is T1+27 μs, and the preset receiving time of the third routing device 140 is T1+63 μs.

In this embodiment, by adopting the information processing method including the above steps S110 to S140, the first time adjustment information carried by the first data message is acquired and the processing time for performing the first processing on the first data message is acquired, and when it is determined that data message timeout processing is presence, second processing is performed on the first data message based on the first time adjustment information, the processing time and the preset processing time threshold, such that the transmission of the first data message can meet the requirements of TSN for end-to-end delay.

In an embodiment, as shown in FIG. 7, S140 is further illustrated, which may include, but not limited to, following steps S141 and S142.

At S141, an absolute value of a difference between the processing time and the first time adjustment information is acquired to obtain a correction processing time.

In this step, since the first time adjustment information is obtained in S120, the processing time for performing first processing on the first data message is obtained in S130, and the first time adjustment information is an adjustment value of the staying time of the first data message in the routing device, the absolute value of the difference between the processing time and the first time adjustment information may be acquired first to obtain the correction processing time. Therefore, specific processing to be performed on the first data message may be determined based on the correction processing time and the preset processing time threshold in the subsequent step.

It should be noted that the processing time for performing the first processing on the first data message may be regarded as the staying time of the first data message in the routing device, so that the correction processing time can be regarded as the time that the first data message can stay in the routing device without exceeding a specified total path transmission delay. Therefore, when it is determined that data message timeout processing is presence, whether the time of receiving the first data message exceeds the preset receiving time or the processing time is greater than the preset processing time threshold, the correction processing time may be obtained based on the absolute value of the difference between the processing time and the first time adjustment information, so as to determine whether the first data message may be forwarded to the user terminal device within the specified total path transmission delay based on the correction processing time in the subsequent step, thereby determining the specific processing to be performed on the first data message. The total path transmission delay refers to the total time taken for a data message to be transmitted from one user terminal device to another user terminal device through a certain transmission path. The specified total path transmission delay refers to the total time taken for a data message to be transmitted from one user terminal device to another user terminal device through a certain transmission path, which is pre-calculated and determined by a network controller.

At S142, when the correction processing time is less than or equal to the preset processing time threshold, the first data message is forwarded.

In this step, since the correction processing time is obtained in S141, the correction processing time and the preset processing time threshold may be compared. In the case that the correction processing time is less than or equal to the preset processing time threshold, it indicates that the current routing device may complete the processing performed on the first data message within the preset processing time threshold and forward the first data message to the user terminal device within the specified total path transmission delay. Therefore, when it is determined that the correction processing time is less than or equal to the preset processing time threshold, the first data message may be forwarded to complete the second processing performed on the first data message.

Figure 8:
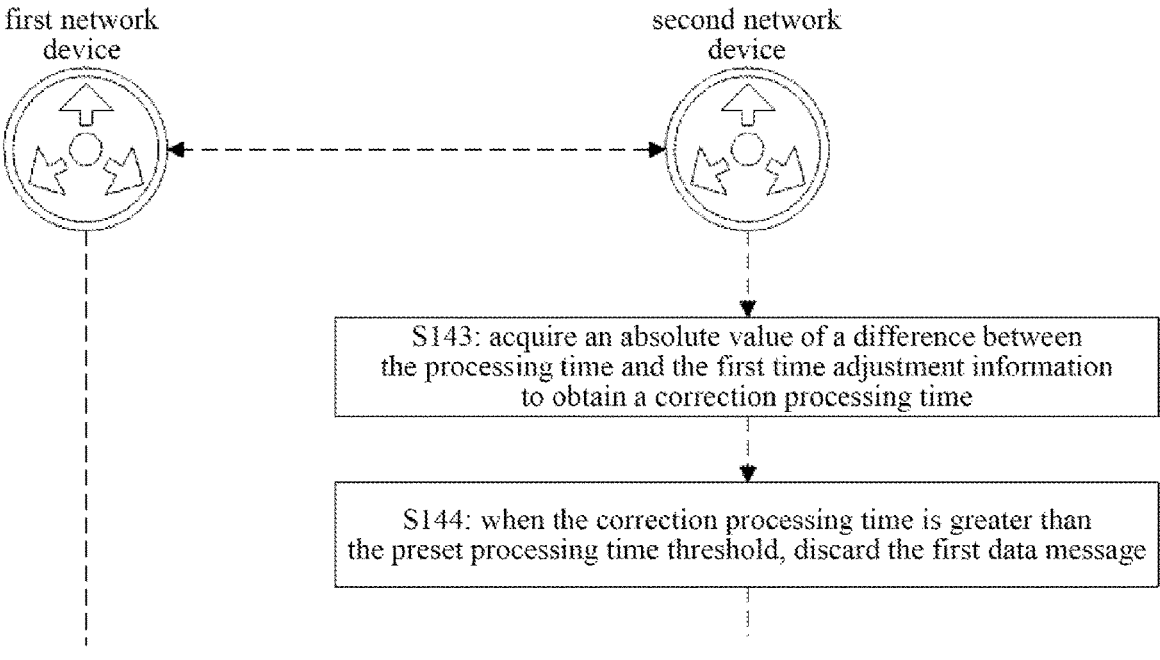
FIG. 8 is a flowchart of another method of step S140 in FIG. 2.

In an embodiment, as shown in FIG. 8, S140 is further illustrated, which may further include, but not limited to, the following steps S143 and S144.

At S143, an absolute value of a difference between the processing time and the first time adjustment information is acquired to obtain a correction processing time.

At S144, when the correction processing time is greater than the preset processing time threshold, the first data message is discarded.

It should be noted that steps S143 and S144 in this embodiment and steps S141 and S142 in the embodiment shown in FIG. 7 are parallel technical schemes, and differences between the two embodiments lie in that the processing performed on the first data message is different. The differences between the two embodiments will be described below. In order to avoid repetition and redundancy, for similarities between the two embodiments, reference may be made to relevant descriptions and illustrations in the embodiment shown in FIG. 7, which will not be repeated here.

In this embodiment, after the correction processing time is obtained by executing S143, the correction processing time and the preset processing time threshold are compared. In the case that the correction processing time is greater than the preset processing time threshold, it indicates that the current routing device may not complete the processing performed on the first data message within the preset processing time threshold, so the first data message cannot be forwarded to the user terminal device within the specified total path transmission delay. Therefore, when it is determined that the correction processing time is greater than the preset processing time threshold, the first data message may be discarded to complete second processing performed on the first data message.

Figure 9:
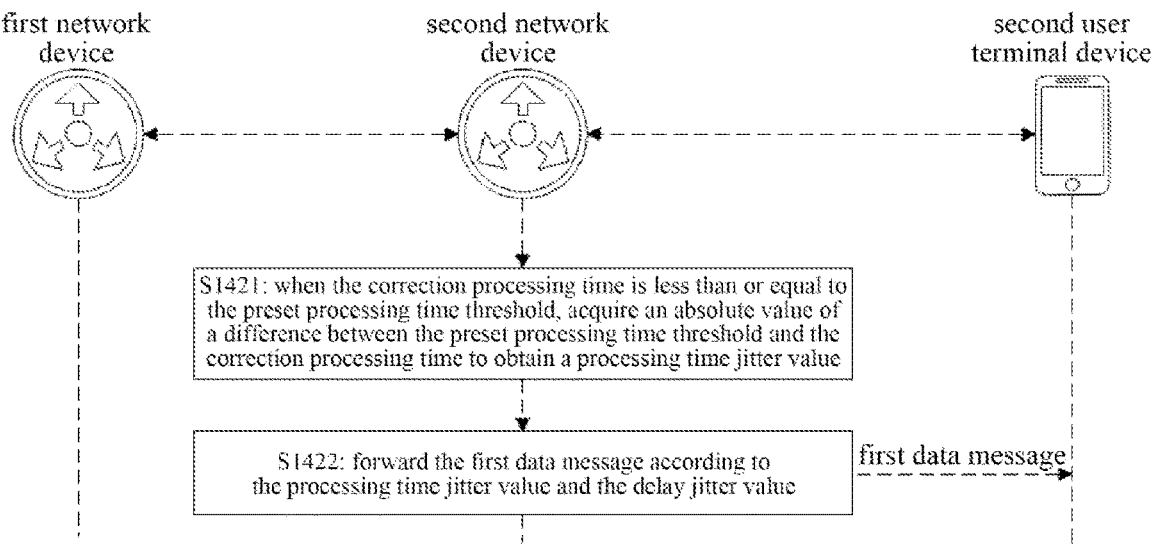
FIG. 9 is a flowchart of a method of step S142 in FIG. 7.

In an embodiment, as shown in FIG. 9, in the case where the first data message further includes a delay jitter value, S142 is further illustrated, which may include, but not limited to, the following steps S1421 and S1422.

At S1421, when the correction processing time is less than or equal to the preset processing time threshold, an absolute value of a difference between the preset processing time threshold and the correction processing time is acquired to obtain a processing time jitter value.

In this step, in the case where the correction processing time is less than or equal to the preset processing time threshold, the absolute value of the difference between the preset processing time threshold and the correction processing time may be acquired to obtain the processing time jitter value, so that the time for forwarding the first data message can be determined based on the processing time jitter value and the delay jitter value in the subsequent step, so as to meet the requirements of TSN for time jitter.

It should be noted that since the preset processing time threshold is the maximum allowable time for a data message to stay in a routing device, and the correction processing time is the time for a data message to stay in a routing device without exceeding the specified total path transmission delay, the processing time jitter value may represent the jitter of the transmission time of the data message. That is, based on the processing time jitter value, a deviation between an actual transmission time of the data message and the transmission time specified in advance by the network controller may be determined. In addition, the delay jitter value refers to an expected deviation value between an actual total path transmission delay and the total path transmission delay pre-specified by the network controller. When the deviation value between the actual total path transmission delay and the total path transmission delay pre-specified by the network controller meets the delay jitter value, it indicates that the current transmission path can provide high transmission quality.

It should be noted that there are many different ways to encapsulate the delay jitter value in the first data message. For example, when the label stack information issued by the network controller is encapsulated in the first data message, a label entry for encapsulating the delay jitter value may be newly added to the label stack information. The label stack information may be a label list in the SR-MPLS technology, a segment identifier list in the SRv6 technology, or data stack information in other similar technologies, which is not limited in this embodiment. For another example, when the first data message is a message adopting a Layer 2 Ethernet frame encapsulation structure to which a message encapsulation structure for encapsulating the delay jitter value may be newly added.

Figures 10, 11:
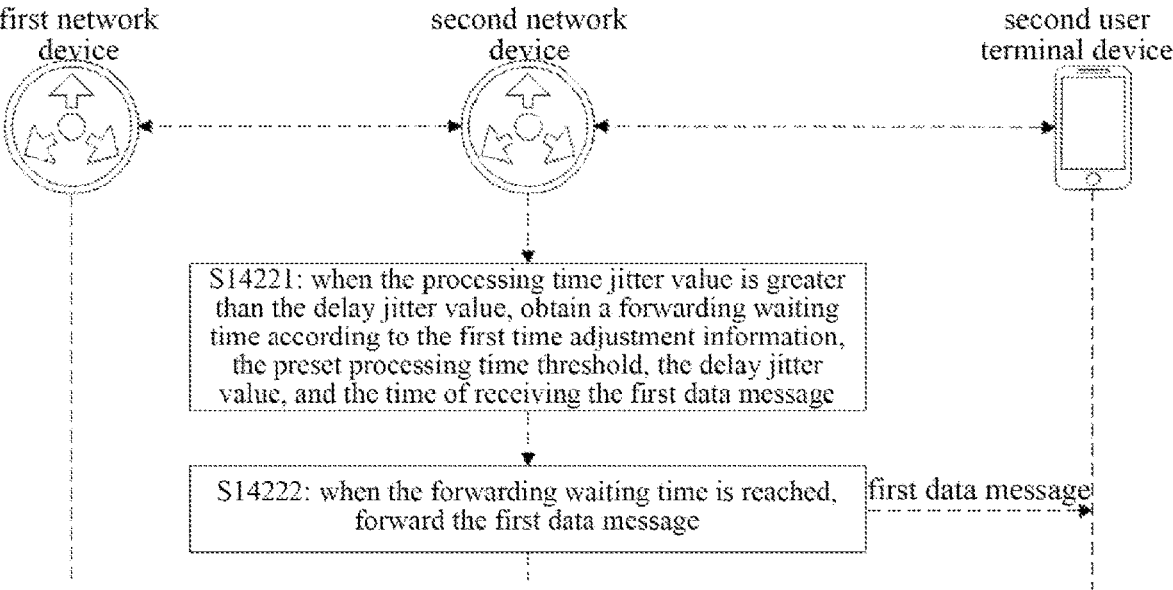
FIG. 10 is a schematic diagram of an encapsulation structure for encapsulating a delay jitter value provided by an example of the present disclosure.
FIG. 11 is a flowchart of a method of step S1422 in FIG. 9.

As shown in FIG. 10, FIG. 10 is a schematic diagram of an encapsulation structure for encapsulating a delay jitter value provided by an example. In FIG. 10, the encapsulation structure includes a flag bit field, a delay jitter value field and a unit field. The flag bit field is used to indicate whether the data message is sensitive to end-to-end jitter. For example, when the flag bit field has a value of 0, it indicates that the data message is not sensitive to end-to-end jitter, and when the flag bit field has a value of 1, it indicates that the data message is sensitive to end-to-end jitter. The delay jitter value field is used to indicate a specific numerical value (absolute value) of the delay jitter value. The unit field is used to indicate the unit of the delay jitter value. For example, when the value of the unit field is a binary value of "00", it indicates that the unit of the delay jitter value is ns; when the value of the unit field is a binary value "01", it indicates that the unit of the delay jitter value is μs; when the value of the unit field is a binary value of "10", it indicates that the unit of the delay jitter value is ms; and when the value of the unit field is a binary value of "11", it indicates that the unit of the delay jitter value is s. In an example, assuming the value of the flag bit field is 1, the value of the delay jitter value field is 20, and the value of the unit field is a binary value "01", it indicates that the data message is sensitive to end-to-end jitter, and the delay jitter value is specifically 20 μs.

As shown in FIG. 4, in addition to labels corresponding to segments in the transmission path and the newly added label entry for encapsulating the first time adjustment information, the label stack information further includes a newly added label entry for encapsulating the delay jitter value. The encapsulation structure of the label entry for encapsulating the delay jitter value is shown in FIG. 10, and the label entry for encapsulating the delay jitter value is set below the label entry for encapsulating the first time adjustment information.

As shown in FIG. 5, in FIG. 5, in addition to segment identifiers corresponding to segments in the transmission path, the maximum allowable time for a message to stay in a device, and the newly added encapsulation structure for encapsulating the first time adjustment information, the label stack information further includes a newly added encapsulation structure for encapsulating the delay jitter value which is shown in FIG. 10, and is set behind the encapsulation structure for encapsulating the first time adjustment information.

As shown in FIG. 6, in addition to an Ethernet type field and an encapsulation structure for encapsulating the first time adjustment information, the message encapsulation structure newly added to the Layer 2 Ethernet frame encapsulation structure further includes an encapsulation structure for encapsulating the delay jitter value. The encapsulation structure for encapsulating the delay jitter value is as shown in FIG. 10, and is set behind the encapsulation structure for encapsulating the first time adjustment information.

At S1422, the first data message is forwarded based on the processing time jitter value and the delay jitter value.

In this step, since the processing time jitter value is obtained in S1421, the first data message may be forwarded based on the processing time jitter value and the delay jitter value. For example, when the processing time jitter value is greater than the delay jitter value, it indicates that the actual transmission time of the first data message is greatly deviated from the transmission time pre-specified by the network controller, and cannot meet the requirements of TSN for time jitter. Therefore, the first data message may be forwarded after waiting for a specific time, such that the actual transmission time of the first data message conforms to the transmission time pre-specified by the network controller, and meets the requirements of TSN for time jitter. When the processing time jitter value is less than or equal to the delay jitter value, it indicates that the actual transmission time of the first data message has little deviation from or matches with the transmission time pre-specified by the network controller, and meets the requirements of TSN for time jitter. Therefore, the first data message may be directly forwarded to enable the actual transmission time of the first data message to meet the requirements of TSN for time jitter.

In an embodiment, as shown in FIG. 11, S1422 is further illustrated, which may include, but not limited to, the following steps S14221 and S14222.

At S14221, when the processing time jitter value is greater than the delay jitter value, a forwarding waiting time is obtained based on the first time adjustment information, the preset processing time threshold, the delay jitter value, and the time of receiving the first data message.

At S14222, when the forwarding waiting time is reached, the first data message is forwarded.

In this embodiment, since the processing time jitter value is obtained in S1421, the processing time jitter value and the delay jitter value may be compared, and then a specific time for forwarding the first data message may be determined according to a comparison result of the processing time jitter value and the delay jitter value, so that the actual transmission time of the first data message can meet the requirements of TSN for time jitter.

When the processing time jitter value is greater than the delay jitter value, it indicates that the actual transmission time of the first data message is greatly deviated from the transmission time pre-specified by the network controller, and cannot meet the requirements of TSN for time jitter. In this case, the forwarding waiting time may be obtained based on the first time adjustment information, the preset processing time threshold, the delay jitter value, and the time of receiving the first data message, and then the first data message is forwarded when the forwarding waiting time is reached, such that the actual transmission time of the first data message conforms to the transmission time pre-specified by the network controller, and meets the requirements of TSN for time jitter.

In an implementation, obtaining a forwarding waiting time based on the first time adjustment information, the preset processing time threshold, the delay jitter value, and the time of receiving the first data message may include: adding up the first time adjustment information, the preset processing time threshold and the time of receiving the first data message to obtain a sum value, and then subtracting the delay jitter value from the sum value to obtain the forwarding waiting time.

In addition, in another embodiment, when the processing time jitter value is less than or equal to the delay jitter value, it indicates that the actual transmission time of the first data message has little deviation from or matches with the transmission time pre-specified by the network controller, and thus meets the requirements of TSN for time jitter. Therefore, the first data message may be directly forwarded without calculating and waiting for the forwarding waiting time, so that the actual transmission time of the first data message can meet the requirements of TSN for time jitter.

In addition, as shown in FIG. 12, another embodiment of the present disclosure also provides an information processing method which may be applied to a first network device. The first network device may be a routing device serving as a starting node, or a routing device serving as an intermediate node. For example, the first network device may be the first routing device 120 in the network topology shown in FIG. 1, or the second routing device 130 in the network topology shown in FIG. 1. The information processing method may include, but not limited to, the following steps S210, S220, S230 and S240.

At S210, a second data message is received, where the second data message includes second time adjustment information.

It should be noted that the second time adjustment information is an adjustment value of a staying time of the second data message in the routing device, and the second time adjustment information has an identical function as the first time adjustment information in any of the above-mentioned embodiments. For the function of the second time adjustment information, reference may be made to relevant descriptions of the function of the first time adjustment information in any of the above-mentioned embodiments, which will not be repeated here. In addition, the encapsulation method of the second time adjustment information in the second data message and the first time adjustment information in the first data message are identical, as discussed in any of the above-mentioned embodiments. For the encapsulation method of the second time adjustment information in the second data message, reference may be made to the relevant descriptions of the encapsulation method of the first time adjustment information in the first data message in any of the above-mentioned embodiments, which will not be repeated here.

At S220, a data processing time is acquired, where the data processing time is used to represent a time required by the first network device for processing the second data message.

In this step, since the first network device obtains the second data message including second time adjustment information in S210, related processing may be performed on the second data message and the data processing time required by the first network device for processing the second data message may be acquired, such that the first time adjustment information may be obtained based on the data processing time in a subsequent step.

It should be noted that performing, by the second network device, related processing on the second data message at least includes acquiring data information carried by the second data message. For example, the related processing may include: acquiring the second time adjustment information carried by the second data message, acquiring the label information in the label stack information carried by the second data message, acquiring forwarding port information based on the label information and the local label forwarding table, etc., which is not limited in this embodiment.

In an implementation, acquiring a data processing time may include: acquiring a receiving timestamp of receiving the second data message, acquiring a completion timestamp of completing the processing performed on the second data message, and calculating a difference between the completion timestamp and the receiving timestamp to obtain the data processing time.

In another implementation, acquiring a data processing time may include: starting a preset timer when the second data message is received, so that the timer starts counting from 0, and stopping the timer when the processing performed on the second data message is completed, and acquiring a timing value of the timer to obtain the data processing time.

At S230, first time adjustment information is obtained based on the second time adjustment information, the data processing time and a preset processing time threshold.

In this step, since the data processing time is obtained in S220, the second data message includes the second time adjustment information, and the second time adjustment information has the identical function as the first time adjustment information in any of the above-mentioned embodiments, which both represent an adjustment value of the staying time of the data message in the routing device, the first time adjustment information may be obtained based on the second time adjustment information, the data processing time and the preset processing time threshold, so that a first data message carrying the first time adjustment information can be obtained in the subsequent step and sent to a second network device. Therefore, the second network device can obtain the time consumption for the first network device to process the second data message.

It should be noted that the preset processing time threshold in this step is the identical with the preset processing time threshold described in any of the above-mentioned embodiments. For the illustration of the preset processing time threshold in this step, reference may be made to relevant descriptions and illustrations of the preset processing time threshold in any of the above-mentioned embodiments, which will not be repeated here.

At S240, a first data message including the first time adjustment information is sent to the second network device, so that the second network device performs the information processing method as described in any of the above embodiments.

In this step, since the first time adjustment information is obtained in S230, a first data message may be constructed to carry the first time adjustment information, and then sent to the second network device, so that the second network device can perform the information processing method in any of the above embodiments, for example, the information processing method in the embodiment shown in FIG. 2. When it is determined that data message timeout processing is presence, second processing is performed on the first data message based on the first time adjustment information, the processing time and the preset processing time threshold, such that the transmission of the first data message can meet the requirements of TSN for end-to-end delay.

It should be noted that after the first time adjustment information is obtained by executing S230, the second data message may be updated to the first data message by updating the second time adjustment information to the first time adjustment information.

In an embodiment, as shown in FIG. 13, S230 is further illustrated, which may include, but not limited to, the following steps S231 and S232.

At S231, the data processing time is subtracted from the preset processing time threshold to obtain a processing time difference.

In this step, the preset processing time threshold is the maximum allowable time for the second data message to stay in the first network device, and the data processing time is the time required by the first network device for processing the second data message. Therefore, the processing time difference obtained by subtracting the data processing time from the preset processing time threshold may represent whether the first network device processes the second data message overtime or completes the processing performed on the second data message within a specified time. For example, assuming that the processing time difference is positive, it indicates that the first network device may complete the processing performed on the second data message within the preset processing time threshold; otherwise, assuming that the processing time difference is negative, it indicates that the first network device may not complete the processing performed on the second data message within the preset processing time threshold, so that the first network device processes the second data message overtime. Since the processing time difference may represent whether the first network device processes the second data message overtime or completes the processing of the second data message within a specified time, the processing time difference obtained by S231 can facilitate obtaining the first time adjustment information based on the processing time difference in a subsequent step.

At S232, the processing time difference and the second time adjustment information are added up to obtain the first time adjustment information.

In this step, since the processing time difference is obtained in S231, the processing time difference and the second time adjustment information may be added up to obtain the first time adjustment information.

It should be noted that when the processing time difference is positive, it indicates that the first network device may complete the processing performed on the second data message within the preset processing time threshold. In other words, the processing time difference may form an idle time that allows the second network device to extend the time for processing the data message. Thus, the processing time difference and the second time adjustment information may be added up to obtain the first time adjustment information so that the first data message including the first time adjustment information can be sent to the second network device in a subsequent step. Then, the second network device can obtain the idle time and determine whether to forward the first data message or when to forward the first data message based on the idle time.

In addition, when the processing time difference is negative, it indicates that the first network device may not complete the processing performed on the second data message within the preset processing time threshold. In other words, the processing time difference may form a delay time that requires the second network device to shorten the time for processing the data message. Thus, the processing time difference and the second time adjustment information may be added up to obtain the first time adjustment information so that the first data message including the first time adjustment information can be sent to the second network device in the subsequent step. Then, the second network device can obtain the delay time and determine whether to forward the first data message or when to forward the first data message based on the delay time.

In an embodiment, as shown in FIG. 14, in the case where the first network device is a routing device serving as a starting node, S210 is further illustrated, which may include, but not limited to, the following steps S211 and S212.

At S211, a service data message is received.

In this step, in the case where the first network device is a routing device serving as a starting node, a service data message is sent by a user terminal device to the first network device. The user terminal device may be, for example, the first terminal device 110 in the network topology shown in FIG. 1.

At S212, a second data message is formed by encapsulating label stack information in the service data message. The label stack information includes the second time adjustment information.

In this step, since the service data message is received in S211, label stack information may be encapsulated in the service data message to obtain a second data message, so that the first network device and other subsequent network devices can forward the second data message based on the label stack information.

It should be noted that in the case where the first network device is a routing device serving as a starting node, the label stack information is obtained by the first network device from the network controller. The network controller is configured to acquire various network information such as network topology, link delay, message processing delay of a device, message processing delay jitter of a device, etc., through the routing devices, determining forwarding label information from the starting node to an end node based on the network information, and form the label stack information based on the forwarding label information. After obtaining the label stack information, the network controller may be configured to add the second time adjustment information in the label stack information. An initial value of the second time adjustment information may be 0. In addition, in an embodiment, the network controller may also add the delay jitter value in the label stack information.

In addition, as shown in FIG. 15, another embodiment of the present disclosure also provides an information processing method, which may be applied to a network system. The network system may include a first network device and a second network device. The first network device may be a routing device serving as a starting node, or a routing device serving as an intermediate node. For example, the first network device may be the first routing device 120 in the network topology shown in FIG. 1, or the second routing device 130 in the network topology shown in FIG. 1. The second network device may be a routing device serving as an end node, such as the third routing device 140 in the network topology shown in FIG. 1. The information processing method may include, but not limited to, the following steps S310, S320, S330 and S340.

At S310, the second network device is configured to receive a first data message sent by the first network device, which includes first time adjustment information.

At S320, the second network device is configured to perform first processing on the first data message to obtain the first time adjustment information.

At S330, the second network device is configured to acquire a processing time for performing the first processing on the first data message.

At S340, when it is determined that data message timeout processing is presence, the second network device is configured to perform second processing on the first data message based on the first time adjustment information, the processing time and a preset processing time threshold.

It should be noted that the information processing method in this embodiment belongs to the same inventive concept as the information processing method in the above-mentioned embodiment as shown in FIG. 2, and the difference between the two methods lies in that the execution subjects are different. The execution subject of the information processing method in the embodiment as shown in FIG. 2 is the second network device, while the execution subject of the information processing method in this embodiment is the network system including the second network device. Therefore, the information processing method in this embodiment has the same technical principle and the same technical effects as the information processing method in the above-mentioned embodiment as shown in FIG. 2. For the technical principle and technical effects of the information processing method in this embodiment, reference may be made to relevant descriptions of the information processing method in the above-mentioned embodiment as shown in FIG. 2, which will not be repeated here to avoid repetition and redundancy.

It should be noted that the data message timeout processing in S340 includes at least one of a time of receiving the first data message by the second network device exceeding a preset receiving time, or the processing time for performing first processing on the first data message by the second network device being greater than the preset processing time threshold. For example, when the time of receiving the first data message by the second network device exceeds the preset receiving time, it indicates the presence of first data message timeout processing in at least one network device before the second network device (such as the first network device), which may lead to the problem of transmission delay of the first data message in a current transmission path. For another example, when the processing time for performing first processing on the first data message by the second network device is greater than the preset processing time threshold, it indicates the presence of first data message timeout processing in the second network device, which may lead to the problem of transmission delay of the first data message in the current transmission path. Since the first time adjustment information is an adjustment value of a staying time of the first data message in the second network device, the time for forwarding the first data message by the second network device can be adjusted based on the first time adjustment information, the processing time and the preset processing time threshold. Therefore, the transmission of the first data message can meet the requirements of TSN for end-to-end delay.

In addition, in an embodiment, step S340 is further illustrated, which may include, but not limited to, following steps of: acquiring, by the second network device, an absolute value of a difference between the processing time and the first time adjustment information to obtain a correction processing time; and forwarding, by the second network device, the first data message when the correction processing time is less than or equal to the preset processing time threshold.

It should be noted that the steps in this embodiment have the same technical principle and the same technical effects as steps S141 and S142 in the embodiment as shown in FIG. 7, and the difference between the two embodiments lies in that the execution subjects are different. The execution subject in the embodiment as shown in FIG. 7 is the second network device, while the execution subject in this embodiment is the network system including the second network device. For the technical principle and technical effects of this embodiment, reference may be made to relevant descriptions in the embodiment as shown in FIG. 7, which will not be repeated here to avoid repetition and redundancy.

In addition, in an embodiment, step S340 is further illustrated, which may further include, but not limited to, the following steps of: acquiring, by the second network device, an absolute value of a difference between the processing time and the first time adjustment information to obtain a correction processing time; and discarding, by the second network device, the first data message when the correction processing time is greater than the preset processing time threshold.

It should be noted that the steps in this embodiment have the same technical principle and the same technical effects as steps S143 and S144 in the embodiment as shown in FIG. 8, and the difference between the two embodiments lies in that the execution subjects are different. The execution subject in the embodiment as shown in FIG. 8 is the second network device, while the execution subject in this embodiment is the network system including the second network device. For the technical principle and technical effects of this embodiment, reference may be made to relevant descriptions in the embodiment as shown in FIG. 8, which will not be repeated here to avoid repetition and redundancy.

In addition, in an embodiment, in the case where the first data message further includes a delay jitter value, the above step "forwarding, by the second network device, the first data message when the correction processing time is less than or equal to the preset processing time threshold" is further illustrated, which may include, but not limited to, the following steps.

The second network device is configured to acquire an absolute value of a difference between the preset processing time threshold and the correction processing time to obtain a processing time jitter value when the correction processing time is less than or equal to the preset processing time threshold.

The second network device is configured to forward the first data message based on the processing time jitter value and the delay jitter value.

It should be noted that the steps in this embodiment have the same technical principle and the same technical effects as steps S1421 and S1422 in the embodiment as shown in FIG. 9, and the difference between the two embodiments lies in that the execution subjects are different. The execution subject in the embodiment as shown in FIG. 9 is the second network device, while the execution subject in this embodiment is the network system including the second network device. For the technical principle and technical effects of this embodiment, reference may be made to relevant descriptions in the embodiment as shown in FIG. 9, which will not be repeated here to avoid repetition and redundancy.

In addition, in an embodiment, the above step "forwarding, by the second network device, the first data message according to the processing time jitter value and the delay jitter value" is further illustrated, which may include, but not limited to, the following steps of: obtaining, by the second network device, a forwarding waiting time based on the first time adjustment information, the preset processing time threshold, the delay jitter value, and the time of receiving the first data message when the processing time jitter value is greater than the delay jitter value; and forwarding, by the second network device, the first data message when the forwarding waiting time is reached.

It should be noted that the steps in this embodiment have the same technical principle and the same technical effects as steps S14221 and S14222 in the embodiment as shown in FIG. 11, and the difference between the two embodiments lies in that the execution subjects are different. The execution subject in the embodiment as shown in FIG. 11 is the second network device, while the execution subject in this embodiment is the network system including the second network device. For the technical principle and technical effects of this embodiment, reference may be made to relevant descriptions in the embodiment as shown in FIG. 11, which will not be repeated here to avoid repetition and redundancy.

In addition, in another embodiment, when the processing time jitter value is less than or equal to the delay jitter value, it indicates that an actual transmission time of the first data message has little deviation from or matches with a transmission time pre-specified by the network controller, and thus meets the requirements of TSN for time jitter. Therefore, the second network device may directly forward the first data message without calculating and waiting for the forwarding waiting time, so that the actual transmission time of the first data message can meet the requirements of TSN for time jitter.

In addition, in an embodiment, before the second network device receives a first data message sent by the first network device, the information processing method may further include, but not limited to, the following steps: receiving, by the first network device, a second data message including second time adjustment information; acquiring, by the first network device, a data processing time representing a time required by the first network device for processing the second data message; obtaining, by the first network device, first time adjustment information based on the second time adjustment information, the data processing time and a preset processing time threshold; and sending, by the first network device, a first data message including the first time adjustment information to the second network device.

It should be noted that the steps in this embodiment have the same technical principle and the same technical effects as steps S210 to S240 in the embodiment as shown in FIG. 12, and the difference between the two embodiments lies in that the execution subjects are different. The execution subject in the embodiment as shown in FIG. 12 is the first network device, while the execution subject in this embodiment is the network system including the first network device. For the technical principle and technical effects of this embodiment, reference may be made to relevant descriptions in the embodiment as shown in FIG. 12, which will not be repeated here to avoid repetition and redundancy.

In addition, in an embodiment, the above step "obtaining, by the first network device, first time adjustment information based on the second time adjustment information, the data processing time and a preset processing time threshold" is further illustrated, which may include, but not limited to, the following steps: subtracting, by the first network device, the data processing time from the preset processing time threshold to obtain a processing time difference; and adding up, by the first network device, the processing time difference and the second time adjustment information to obtain the first time adjustment information.

It should be noted that the steps in this embodiment have the same technical principle and the same technical effects as steps S231 and S232 in the embodiment as shown in FIG. 13, and the difference between the two embodiments is that the execution subjects are different. The execution subject in the embodiment as shown in FIG. 13 is a first network device, while the execution subject in this embodiment is the network system including the first network device. For the technical principle and technical effects of this embodiment, reference may be made to relevant descriptions in the embodiment as shown in FIG. 13, which will not be repeated here to avoid repetition and redundancy.

In addition, in an embodiment, the above step "receiving, by the first network device, a second data message" is further illustrated, which may include, but not limited to, the following steps: receiving, by the first network device, a service data message; and encapsulating, by the first network device, label stack information in the service data message to obtain the second data message. The label stack information includes the second time adjustment information.

It should be noted that the steps in this embodiment have the same technical principle and the same technical effects as steps S211 and S212 in the embodiment as shown in FIG. 14, and the difference between the two embodiments lies in that the execution subjects are different. The execution subject in the embodiment as shown in FIG. 14 is the first network device, while the execution subject in this embodiment is the network system including the first network device. For the technical principle and technical effects of this embodiment, reference may be made to relevant descriptions in the embodiment as shown in FIG. 14, which will not be repeated here to avoid repetition and redundancy.

In order to clearly illustrate the processing flow of the information processing method provided by the embodiment of the present disclosure, the processing flow is described below with examples.

Figure 16:
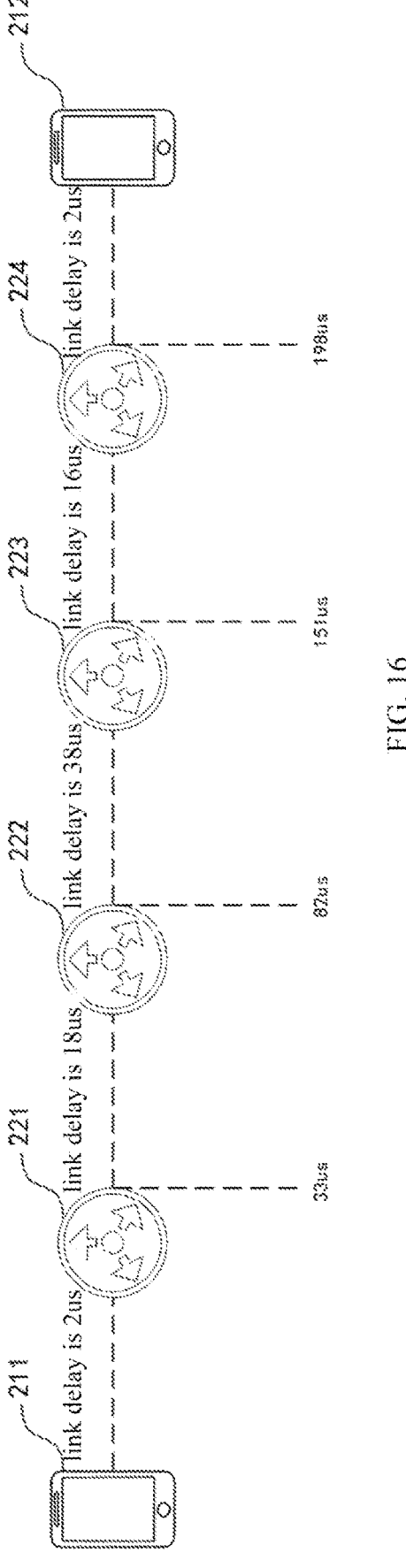
FIG. 16 is a schematic diagram of a network topology provided by an example of the present disclosure.

As shown in FIG. 16, FIG. 16 is a schematic diagram of a network topology provided by an example. In FIG. 16, the network topology includes a first user terminal device 211, a first router 221, a second router 222, a third router 223, a fourth router 224 and a second user terminal device 212 which are communicatively connected in sequence. In addition, the network topology further includes a network controller (not shown in the figure) connected with the first router 221, the second router 222, the third router 223 and the fourth router 224, respectively. In the network topology, the processing delay jitter values of the first router 221, the second router 222, the third router 223 and the fourth router 224 are all 5 μs. The link delay between the first user terminal device 211 and the first router 221 is 2 μs. The link delay between the first router 221 and the second router 222 is 18 μs. The link delay between the second router 222 and the third router 223 is 38 μs. The link delay between the third router 223 and the fourth router 224 is 16 μs. The link delay between the fourth router 224 and the second user terminal device 212 is 2 μs. The preset processing time threshold (that is, the maximum allowable time for a data message to stay locally) for each of the first router 221, the second router 222, the third router 223 and the fourth router 224 is 31 μs. Therefore, as shown in FIG. 16, the latest forwarding time allocated to all routers by the network controller are 33 μs, 82 μs, 151 μs and 198 μs, respectively. In addition, in the network topology, the data message is time-sensitive, and the maximum end-to-end delay of the data message from the first user terminal device 211 to the second user terminal device 212 is required to be 200 μs, and the end-to-end time jitter is required to be less than 20 μs.

Based on the network topology as shown in FIG. 16, in the related technical scheme, a scheme is proposed to realize deterministic forwarding of TSN by combining a path distribution function of SR and a queue scheduling mechanism of TSN. However, in the related technical scheme, after the network controller allocates the latest forwarding time to each of the routers, the routers may not change the latest forwarding time. In the case that the processing and queuing delay of a certain router is long and exceeds the latest forwarding time, a data message forwarding timeout will be caused. Then, end-to-end delay cannot be guaranteed, which does not meet the requirements of TSN for end-to-end delay. In addition, in the case that the forwarding delay of each router is very small, the time jitter of the data message from the first user terminal device 211 to the second user terminal device 212 is likely to be too large, which does not meet the requirements of TSN for time jitter.

In order to solve the above problems, in the embodiment of the present disclosure, related information is newly added in the data message, so that each of the routers can control a forwarding policy based on the newly added related information in the data message. Therefore, the last router in the transmission path can perform corresponding processing on the data message based on the newly added related information in the data message, and the transmission of the data message can meet the requirements of TSN for end-to-end delay and time jitter.

Example One

In the network topology as shown in FIG. 16, a data message is forwarded along a transmission path from the first router 221 to the fourth router 224 based on SR-MPLS encapsulation. In the transmission path, label forwarding tables in the routers are as shown in FIGS. 17 to 20. FIG. 17 is a schematic diagram of a label forwarding table in the first router 221. FIG. 18 is a schematic diagram of a label forwarding table in the second router 222. FIG. 19 is a schematic diagram of a label forwarding table in the third router 223. FIG. 20 is a schematic diagram of a label forwarding table in the fourth router 224. As shown in FIG. 21, FIG. 21 is a schematic diagram of label stack information issued by the network controller to the first router 221. The label stack information includes time adjustment information and a delay jitter value.

The processing performed on the data message by each of the first router 221, the second router 222, the third router 223 and the fourth router 224 is as follows.

When the first router 221 receives a data message from the first user terminal device 211, it is determined that a timestamp of receiving the data message is T1arr=2 μs. At this time, the first router 221 is configured to insert the label stack information as shown in FIG. 21 into the data message. Then, the first router 221 is configured to pop up a stack top label 1601 in the label stack information, and find a forwarding port interface1 (arriving at the second router 222 in the next segment) and a preset processing time threshold T1stay=31 μs according to the label forwarding table as shown in FIG. 17. Assuming that the time for the first router 221 to complete processing on the data message is T1pro=30 μs, the sum of T1arr and T1stay minus T1pro is 3 s (the processing time difference is greater than 0, that is, the data processing time is less than the preset processing time threshold). Therefore, the first router 221 may forward the data message before the latest forwarding time. At this time, the first router 221 adds the value of T1arr+T1stay−T1pro (that is, 3 μs) to the time adjustment information Tadj in the label stack information. In this case, the value of Tadj is 3 μs. Then the first router 221 is configured to forward the data message with updated Tadj to the second router 222.

When the second router 222 receives the data message from the first router 221, it is determined that a timestamp of receiving the data message is T2arr=48 μs. Then, the second router 222 is configured to pop up a stack top label 1602 in the label stack information, and find a forwarding port interface2 (arriving at the third router 223 in the next segment) and a preset processing time threshold T2stay=31 μs according to the label forwarding table as shown in FIG. 18. Assuming that the time for the second router 222 to complete processing on the data message is T2pro=85 μs, the sum of T2arr and T2stay minus T2pro is −6 μs (the processing time difference is less than 0, that is, the data processing time is greater than the preset processing time threshold). Therefore, the second router 222 may not complete processing on the data message within the preset processing time threshold. At this time, the processing time difference may be added with a processing delay jitter value T2delay of the second router 222 and time adjustment information Tadj in the label stack information to determine whether the second router 222 may forward the data message before the latest forwarding time. Since T2arr+T2stay−T2pro+T2delay+Tadj=48+31−85+5+3=2 μs, the second router 222 may forward the data message before the latest forwarding time. It should be noted that even if it is determined that the second router 222 may not forward the data message before the latest forwarding time, since the second router 222 is not the end node of the transmission path, the second router 222 still needs to forward the data message at the time when the processing on the data message is completed. At this time, the second router 222 adds the value of T2arr+T2stay−T2pro (that is, −6 μs) to Tadj in the label stack information. In this case, the value of Tadj is −3 μs. Then, the second router 222 is configured to forward the data message with updated Tadj to the third router 223.

When the third router 223 receives the data message from the second router 222, it is determined that a timestamp of receiving the data message is T3arr=123 μs. Then, the third router 223 is configured to pop up a stack top label 1603 in the label stack information, and find a forwarding port interface0 (arriving at the fourth router 224 in the next segment) and a preset processing time threshold T3stay=31 μs according to the label forwarding table as shown in FIG. 19. Assuming that the time for the third router 223 to complete processing on the data message is T3pro=140 μs, the sum of T3arr and T3stay minus T3pro is 14 μs (the processing time difference is greater than 0, that is, the data processing time is less than the preset processing time threshold). Therefore, the third router 223 may forward the data message before the latest forwarding time. At this time, the third router 223 adds the value of T3arr+T3stay−T3pro (i.e., 14 μs) to Tadj in the label stack information. In this case, the value of Tadj is 11 μs. Then, the third router 223 is configured to forward the data message with updated Tadj to the fourth router 224.

When the fourth router 224 receives the data message from the third router 223, it is determined that a timestamp of receiving the data message is T4arr=156 μs. The fourth router 224 finds that the label stack information has arrived at the stack bottom, that is, the fourth router 224 is the last segment. At this time, the fourth router 224 is configured to popsup a stack bottom label 1604 in the label stack information, time adjustment information Tadj and a delay jitter value Jmax, and find a forwarding port interface2 (arriving at the second user terminal device 212 in the next hop) and a preset processing time threshold T4stay=31 μs according to the label forwarding table as shown in FIG. 20. Since a flag bit field in the encapsulation structure for encapsulating the delay jitter value Jmax has a value of 1, it indicates that the data message is sensitive to end-to-end jitter, and the delay jitter value Jmax is 20 μs (that is, the end-to-end time jitter is required to be less than 20 μs). Assuming that the time for the fourth router 224 to complete processing on the data message is T4pro=165 μs, the fourth router 224 is configured to calculate T4arr+T4stay+Tadj−T4pro to obtain a processing time jitter value of 33 μs, which is greater than 20 μs (that is, the processing time jitter value is greater than the delay jitter value), which does not meet the requirements of TSN for end-to-end time jitter. Therefore, the fourth router 224 is configured to calculate T4arr+T4stay+Tadj−Jmax to obtain a forwarding waiting time of 178 μs. Thus, the fourth router 224 is configured to wait 178 μs before forwarding the first data message to the second user terminal device 212.

Example Two

In the network topology as shown in FIG. 16, the data message is forwarded along a transmission path from the first router 221 to the fourth router 224 based on SRv6 encapsulation.

It should be noted that the processing of the data message by the first router 221, the second router 222, the third router 223 and the fourth router 224 in this example is identical with the processing of the data message by the first router 221, the second router 222, the third router 223 and the fourth router 224 in Example one. The difference lies in that the data message in Example one is encapsulated by means of SR-MPLS, while the data message in this example is encapsulated by means of SRv6. Therefore, in this example, for the processing of the data message by the routers, reference may be made to relevant descriptions in Example one, which will not be repeated here to avoid repetition and redundancy.

Example Three

In the network topology as shown in FIG. 16, the data message is forwarded along a transmission path from the first router 221 to the fourth router 224 based on SRv6 encapsulation. As shown in FIG. 22, FIG. 22 is a schematic diagram of label stack information issued by a network controller to the first router 221. The label stack information includes a label value of a next segment, a preset processing time threshold, time adjustment information and a delay jitter value. The preset processing time threshold corresponding to the label value of each segment is 31 µs.

It should be noted that, in this example, the processing of the data message by the first router 221, the second router 222, the third router 223 and the fourth router 224 is similar to the processing of the data message by the first router 221, the second router 222, the third router 223 and the fourth router 224 in Example one. The difference lies in that each router in Example one needs to search for the preset processing time threshold through the label forwarding table, while each router in this example acquires the preset processing time threshold from the label stack information in the data message. Therefore, in this example, for the processing of the data message by the routers, reference may be made to relevant descriptions in Example one, which will not be repeated here to avoid repetition and redundancy.

Example Four

In the network topology as shown in FIG. 16, the data message is forwarded along a transmission path from the first router 221 to the fourth router 224 based on Layer 2 Ethernet frame encapsulation. The network controller may issue a mapping table between data messages and preset processing time thresholds to each of the routers, so that the routers can obtain a local preset processing time threshold through the mapping table after receiving the data message.

It should be noted that, in this example, the processing of the data message by the first router 221, the second router 222, the third router 223 and the fourth router 224 is similar to the processing of the data message by the first router 221, the second router 222, the third router 223 and the fourth router 224 in Example one. The difference lies in that each router in Example one needs to search for the preset processing time threshold through the label forwarding table, while each router in this example obtains the local preset processing time threshold through the mapping table issued by the network controller. Therefore, in this example, for the processing of the data message by the routers, reference may be made to relevant descriptions in Example one, which will not be repeated here to avoid repetition and redundancy.

In addition, an embodiment of the present disclosure further provides a network device, including a memory, a processor and a computer program stored in the memory and executable by the processor.

The processor and the memory may be connected by a bus or in other means.

As a non-transient computer-readable storage medium, the memory may be configured to store non-transient software programs and non-transient computer-executable programs. In addition, the memory may include a high-speed random access memory, and may also include a non-transient memory, such as at least one magnetic disk storage device, a flash memory device, or other non-transient solid state storage device. In some implementations, the memory may include memories remotely located with respect to the processor, and these remote memories may be connected to the processor through networks. Examples of the above networks include, but not limited to, the Internet, an intranet, a local area network, a mobile communication network and combinations thereof.

It should be noted that the network device in this embodiment may serve as, for example, the first routing device 120, the second routing device 130 or the third routing device 140 in the embodiment as shown in FIG. 1. The network device in this embodiment may form a part of the network topology in the embodiment as shown in for example FIG. 1. These embodiments all belong to the same inventive concept, and thus have the same implementation principle and technical effects, which will not be repeated here.

The non-transient software program and instructions required to implement the information processing method in the above embodiment are stored in the memory which, when executed by the processor, cause the processor to implement the information processing method in the above embodiments, for example, perform the above-described steps S110 to S140 in FIG. 2, S141 to S142 in FIG. 7, S143 to S144 in FIG. 8, S1421 to S1422 in FIG. 9, S14221 to S14222 in FIG. 11, S210 to S240 in FIG. 12, S231 to S232 in FIG. 13, and S211 to S212 in FIG. 14.

In addition, an embodiment of the present disclosure further provides a network system which includes a first network device and a second network device. The first network device may serve as, for example, the first routing device 120 or the second routing device 130 in the embodiment as shown in FIG. 1, and the second network device may serve as, for example, the third routing device 140 in the embodiment as shown in FIG. 1. The network system in this embodiment may form a part of the network topology in the embodiment as shown in, for example, FIG. 1. These embodiments all belong to the same inventive concept, and thus have the same implementation principle and technical effects, which will not be repeated here.

The first network device and the second network device may be configured to cooperate with each other to perform the information processing method applied to any embodiment of the network system as described above. For example, the first network device and the second network device are configured to cooperate with each other to perform the steps S310 to S340 in FIG. 15 described above.

The device embodiments or system embodiments described above are merely illustrative, and the units described as separate components may or may not be physically separated. That is, they may be located in one place, or may be distributed onto multiple network elements. Some or all of the modules may be selected according to actual needs to achieve the purpose of this embodiment.

In addition, an embodiment of the present disclosure further provides a computer-readable storage medium storing a computer-executable instruction which, when executed by a processor or controller, for example, by a processor in the network device embodiment described above, causes the processor to perform the information processing method in the above embodiment, for example, perform the above-described steps S110 to S140 in FIG. 2, S141 to S142 in FIG. 7, S143 to S144 in FIG. 8, S1421 to S1422 in FIG. 9, S14221 to S14222 in FIG. 11, S210 to S240 in FIG. 12, S231 to S232 in FIG. 13, S211 to S212 in FIG. 14, and S310 to S340 in FIG. 15.

An embodiment of the present disclosure includes: receiving a first data message including first time adjustment information; performing first processing on the first data message to obtain the first time adjustment information; acquiring a processing time for performing the first processing on the first data message; and when determining a presence of data message timeout processing, performing second processing on the first data message based on the first time adjustment information, the processing time and a preset processing time threshold. According to the scheme provided by the embodiment of the present disclosure, in the case of presence of data message timeout processing in the network device, second processing may be performed on the first data message based on the preset processing time threshold, the first time adjustment information carried in the first data message and the processing time for performing the first processing on the first data message, so that the transmission of the data message can meet the requirements of TSN for end-to-end delay.

Those having ordinary skills in the art can understand that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an Application Specific Integrated Circuit (ASIC). Such software may be distributed on a computer-readable medium which may include a computer storage medium (or a non-transitory medium) and a communication medium (or a transitory medium). As well known to those having ordinary skills in the art, the term computer storage medium includes volatile and nonvolatile, removable and non-removable media implemented in any method or technology for storing information such as computer-readable instructions, data structures, program modules or other data. A computer storage medium may include, but not limited to, RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, as well known to those having ordinary skills in the art, the communication medium may generally include computer-readable instructions, data structures, program modules or other data in a modulated data signal such as a carrier wave or other transmission mechanism, and may include any information delivery medium.

The above is a detailed description of some embodiments of the present disclosure, but the present disclosure is not limited thereto. Those having ordinary skills in the art may also make various equivalent modifications or substitutions without violating the protection scope of the present disclosure, and these equivalent modifications or substitutions are included in the scope defined by the claims of the present disclosure.

What is claimed is:

1. An information processing method, comprising:
receiving a first data message comprising first time adjustment information;
performing first processing on the first data message to obtain the first time adjustment information;
acquiring a processing time for performing the first processing on the first data message; and
in response to determining a presence of data message timeout processing, performing second processing on the first data message based on the first time adjustment information, the processing time and a preset processing time threshold comprising:
acquiring an absolute value of a difference between the processing time and the first time adjustment information to obtain a correction processing time;
in response to the correction processing time being less than or equal to the preset processing time threshold, forwarding the first data message; and
in response to the correction processing time being greater than the preset processing time threshold, discarding the first data message.

2. The method of claim 1, wherein the data message timeout processing comprises at least one of:

a time of receiving the first data message exceeding a preset receiving time; or
the processing time being greater than the preset processing time threshold.

3. The method of claim 1, wherein the first data message further comprises a delay jitter value; and
in response to the correction processing time being less than or equal to the preset processing time threshold, forwarding the first data message comprises:
in response to the correction processing time being less than or equal to the preset processing time threshold, acquiring an absolute value of a difference between the preset processing time threshold and the correction processing time to obtain a processing time jitter value; and
forwarding the first data message based on the processing time jitter value and the delay jitter value.

4. The method of claim 3, wherein forwarding the first data message based on the processing time jitter value and the delay jitter value comprises:
in response to the processing time jitter value being greater than the delay jitter value, obtaining a forwarding waiting time based on the first time adjustment information, the preset processing time threshold, the delay jitter value, and the time of receiving the first data message; and
in response to the forwarding waiting time being reached, forwarding the first data message; or
in response to the processing time jitter value being less than or equal to the delay jitter value, forwarding the first data message.

5. An information processing method, which is applied to a first network device, the method comprising:
receiving a second data message comprising second time adjustment information;
acquiring a data processing time used to represent the time required by the first network device for processing the second data message;
obtaining first time adjustment information based on the second time adjustment information, the data processing time and a preset processing time threshold; and
sending a first data message including the first time adjustment information to a second network device, so that the second network device is configured to perform the information processing method of claim 1.

6. The method of claim 5, wherein obtaining first time adjustment information based on the second time adjustment information, the data processing time and a preset processing time threshold comprises:
subtracting the data processing time from the preset processing time threshold to obtain a processing time difference; and
adding up the processing time difference and the second time adjustment information to obtain the first time adjustment information.

7. The method of claim 5, wherein receiving a second data message comprises:
receiving a service data message; and
encapsulating label stack information in the service data message to obtain the second data message, wherein the label stack information comprises the second time adjustment information.

8. An information processing method, which is applied to a network system comprising a first network device and a second network device, the method comprising:

receiving, by the second network device, a first data message sent by the first network device, wherein the first data message comprises first time adjustment information;

performing, by the second network device, first processing on the first data message to obtain the first time adjustment information;

acquiring, by the second network device, a processing time for performing the first processing on the first data message; and in response to determining a presence of data message timeout processing, performing, by the second network device, second processing on the first data message based on the first time adjustment information, the processing time and a preset processing time threshold comprising:

acquiring, by the second network device, an absolute value of a difference between the processing time and the first time adjustment information to obtain a correction processing time;

in response to the correction processing time being less than or equal to the preset processing time threshold, forwarding, by the second network device, the first data message; and in response to the correction processing time being greater than the preset processing time threshold, discarding, by the second network device, the first data message.

9. The method of claim 8, wherein the data message timeout processing comprises at least one of:

a time of receiving the first data message by the second network device exceeding a preset receiving time; or the processing time being greater than the preset processing time threshold.

10. The method of claim 8, wherein the first data message further comprises a delay jitter value; and in response to the correction processing time being less than or equal to the preset processing time threshold, forwarding, by the second network device, the first data message comprises:

in response to the correction processing time being less than or equal to the preset processing time threshold, acquiring, by the second network device, an absolute value of a difference between the preset processing time threshold and the correction processing time to obtain a processing time jitter value; and forwarding, by the second network device, the first data message based on the processing time jitter value and the delay jitter value.

11. The method of claim 10, wherein forwarding, by the second network device, the first data message based on the processing time jitter value and the delay jitter value comprises:

in response to the processing time jitter value being greater than the delay jitter value, obtaining, by the second network device, a forwarding waiting time based on the first time adjustment information, the preset processing time threshold, the delay jitter value, and a time of receiving the first data message;

in response to the forwarding waiting time being reached, forwarding, by the second network device, the first data message; or in response to the processing time jitter value being less than or equal to the delay jitter value, forwarding, by the second network device, the first data message.

12. The method of claim 8, wherein prior to receiving, by the second network device, a first data message sent by the first network device, the method further comprises:

receiving, by the first network device, a second data message comprising second time adjustment information;

acquiring, by the first network device, a data processing time used to represent the time required by the first network device for processing the second data message;

obtaining, by the first network device, first time adjustment information based on the second time adjustment information, the data processing time and a preset processing time threshold; and sending, by the first network device, a first data message including the first time adjustment information to the second network device.

13. The method of claim 12, wherein obtaining, by the first network device, first time adjustment information based on the second time adjustment information, the data processing time and a preset processing time threshold comprises:

subtracting, by the first network device, the data processing time from the preset processing time threshold to obtain a processing time difference; and adding up, by the first network device, the processing time difference and the second time adjustment information to obtain the first time adjustment information.

14. The method of claim 12, wherein receiving, by the first network device, a second data message comprises:

receiving, by the first network device, a service data message; and encapsulating, by the first network device, label stack information in the service data message to obtain the second data message, wherein the label stack information comprises the second time adjustment information.

15. A network device, comprising:

a memory, a processor, and a computer program stored in the memory and executable by the processor which, when executed by the processor, causes the processor to perform the information processing method of claim 1.

16. A network system, comprising: a first network device and a second network device, wherein the first network device and the second network device are configured to cooperate with each other to perform the information processing method of claim 8.

17. A non-transitory computer-readable storage medium storing a computer-executable instruction which, when executed by a processor, causes the processor to perform the information processing method of claim 1.

* * * * *